United States Patent
Boroff et al.

(10) Patent No.: US 11,526,910 B1
(45) Date of Patent: Dec. 13, 2022

(54) CONTINUOUS REWARDED FEEDBACK SYSTEM AND METHOD TO IMPROVE AD TARGETING ON A MOBILE DEVICE

(71) Applicant: ADFONE, INC., Fort Lauderdale, FL (US)

(72) Inventors: Brian J. Boroff, Delray Beach, FL (US); Tom Wicky, Parkland, FL (US); Jeffrey Toewe, Boca Raton, FL (US); Richard Kane, Wellington, FL (US)

(73) Assignee: PLAY2PAY, INC., Miami, FL (US)

( * ) Notice: Subject to any disclaimer, the term of this patent is extended or adjusted under 35 U.S.C. 154(b) by 315 days.

(21) Appl. No.: 15/149,069

(22) Filed: May 6, 2016

Related U.S. Application Data

(60) Provisional application No. 62/157,643, filed on May 6, 2015.

(51) Int. Cl.
*G06Q 30/02* (2012.01)
*H04M 1/72463* (2021.01)
*H04M 15/00* (2006.01)

(52) U.S. Cl.
CPC .... *G06Q 30/0267* (2013.01); *H04M 1/72463* (2021.01); *H04M 15/8083* (2013.01); *G06Q 30/0253* (2013.01); *H04M 2215/0184* (2013.01)

(58) Field of Classification Search
CPC .................................. G06Q 30/0207–30/0277
USPC ............................................. 705/319, 14.64
See application file for complete search history.

(56) References Cited

U.S. PATENT DOCUMENTS

| | | | | |
|---|---|---|---|---|
| 2008/0318559 | A1* | 12/2008 | Porco | H04L 67/52 455/414.2 |
| 2011/0093320 | A1* | 4/2011 | Blake | H04M 3/4878 705/14.69 |
| 2013/0041731 | A1* | 2/2013 | Navar | G06Q 30/0224 705/14.23 |
| 2013/0111408 | A1* | 5/2013 | Berus | H04W 12/30 715/835 |
| 2013/0124276 | A1* | 5/2013 | Brown | G06Q 30/0267 705/14.4 |
| 2013/0311293 | A1* | 11/2013 | Ward | G06Q 30/0267 705/14.61 |

(Continued)

FOREIGN PATENT DOCUMENTS

CN    104375742 A   *  2/2015

OTHER PUBLICATIONS

Business Model Engineering Analysis on Mobile Client-Side Software Platform Strategies (Year: 2008).*

(Continued)

*Primary Examiner* — Gautam Ubale
(74) *Attorney, Agent, or Firm* — Daniel S. Polley, P.A.

(57) ABSTRACT

A system and method including a downloadable application which forces to view targeted advertisements on their mobile device in order to gain access to use of the mobile device. The ads appear on a lock screen of the mobile device upon powering up or waking up of the mobile device. The user can take one of several actions with respect to the displayed ad and upon such action screen is unlocked and the user is provided with full function of the mobile device. The user can be incented for each action through the accumulation of points which can be used towards paying the user's phone bill or for receiving another reward.

18 Claims, 24 Drawing Sheets

(56) References Cited

U.S. PATENT DOCUMENTS

| | | | | |
|---|---|---|---|---|
| 2014/0019253 A1* | 1/2014 | Ricasata | ............ | G06Q 30/0241 705/14.66 |
| 2014/0074824 A1* | 3/2014 | Rad | ........................ | G06Q 30/02 707/722 |
| 2014/0157199 A1* | 6/2014 | Kahler | ............... | G06Q 30/0255 715/833 |
| 2014/0180817 A1* | 6/2014 | Zilkha | ............... | G06F 16/24575 705/14.55 |
| 2014/0195353 A1* | 7/2014 | Govan | ............... | G06Q 30/0267 705/14.64 |
| 2014/0289761 A1* | 9/2014 | Weinberger | ...... | H04N 21/41407 725/32 |
| 2014/0297417 A1* | 10/2014 | Cusack | .................. | G06Q 30/02 705/14.61 |
| 2014/0310103 A1* | 10/2014 | Ricci | ..................... | H04W 36/34 705/14.62 |
| 2015/0051980 A1* | 2/2015 | Ge | ..................... | G06Q 30/0269 705/14.66 |
| 2015/0051981 A1* | 2/2015 | Ge | ......................... | G06Q 50/01 705/14.66 |
| 2015/0133199 A1* | 5/2015 | Lee | .................. | H04M 1/72463 455/566 |
| 2015/0213504 A1* | 7/2015 | Katz | .................. | G06Q 30/0267 705/14.64 |
| 2015/0310493 A1* | 10/2015 | Chitnis | ............... | G06Q 30/0267 705/14.64 |
| 2015/0381617 A1* | 12/2015 | Jung | ..................... | H04W 12/06 455/411 |
| 2016/0055537 A1* | 2/2016 | Tiger | ..................... | G06Q 50/01 705/14.64 |
| 2016/0092935 A1* | 3/2016 | Bradley | ............. | G06Q 30/0276 705/14.72 |
| 2016/0125466 A1* | 5/2016 | Kulkarni | ............. | G06F 3/04883 705/14.58 |
| 2016/0225007 A1* | 8/2016 | Logsdon | ............. | G06Q 30/0215 |
| 2016/0283978 A1* | 9/2016 | Rabbat | ................ | G06F 3/04842 |
| 2016/0321614 A1* | 11/2016 | Leslie | ................ | G06Q 10/1053 |
| 2016/0379264 A1* | 12/2016 | Kolaja | ............. | G06Q 20/3224 705/14.64 |
| 2017/0046749 A1* | 2/2017 | Kolluri | ............. | G06Q 30/0267 |
| 2017/0140436 A1* | 5/2017 | Zheng | .................... | G06Q 30/02 |
| 2017/0277361 A1* | 9/2017 | Schulze | ................ | G06F 3/0484 |
| 2018/0032997 A1* | 2/2018 | Gordon | ............... | G06Q 30/0269 |
| 2019/0095962 A1* | 3/2019 | Lee | .................... | G06Q 30/0277 |
| 2021/0286863 A1* | 9/2021 | Jung | ........................ | G06F 3/167 |

OTHER PUBLICATIONS

Touchalytics on the Applicability of Touchscreen Input as a Behavioral Biometric for Continuous Authentication (Year: 2012).*

A Method and System for Rendering Mobile Billboards Powered by a Content Provider (Year: 2013).*

* cited by examiner

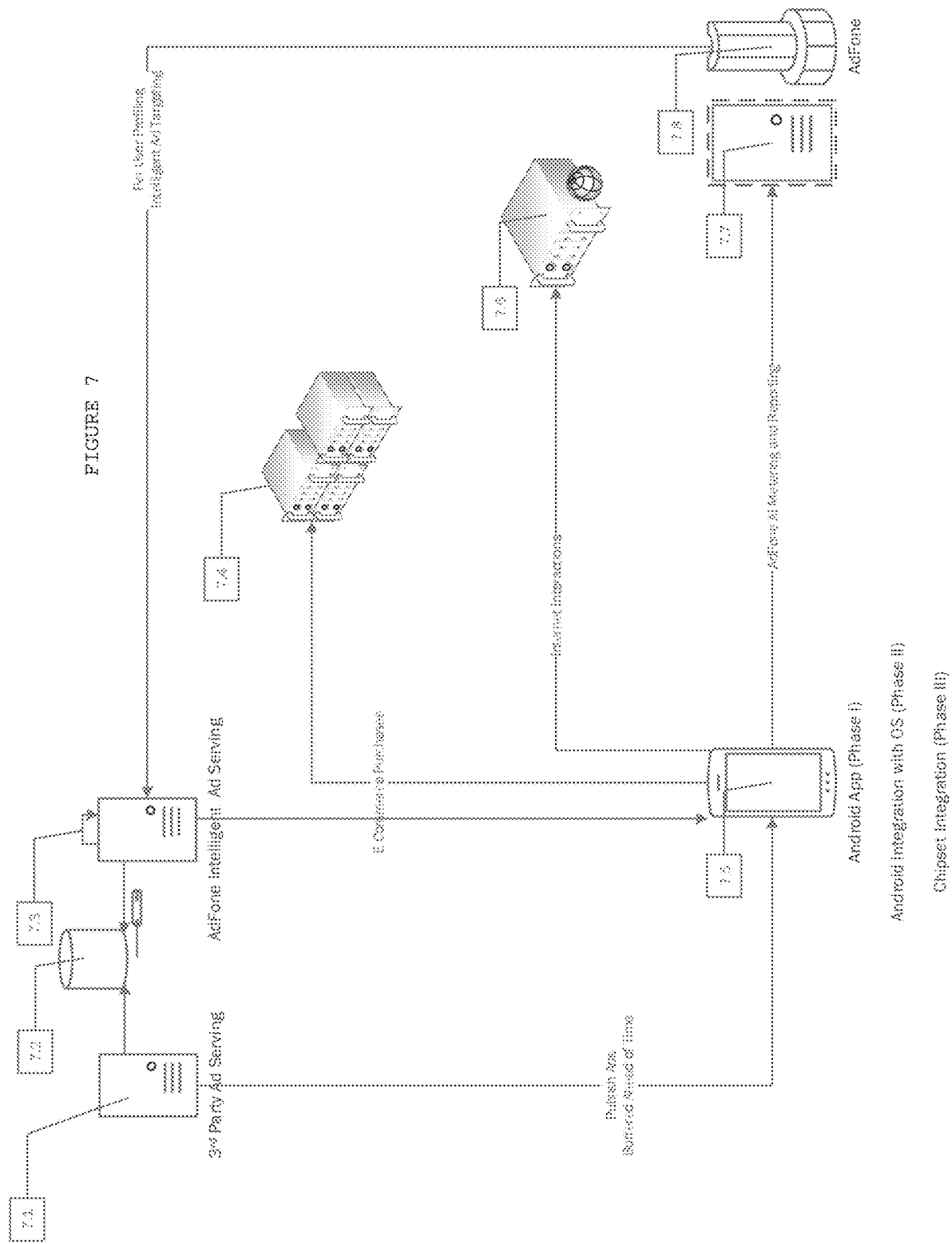

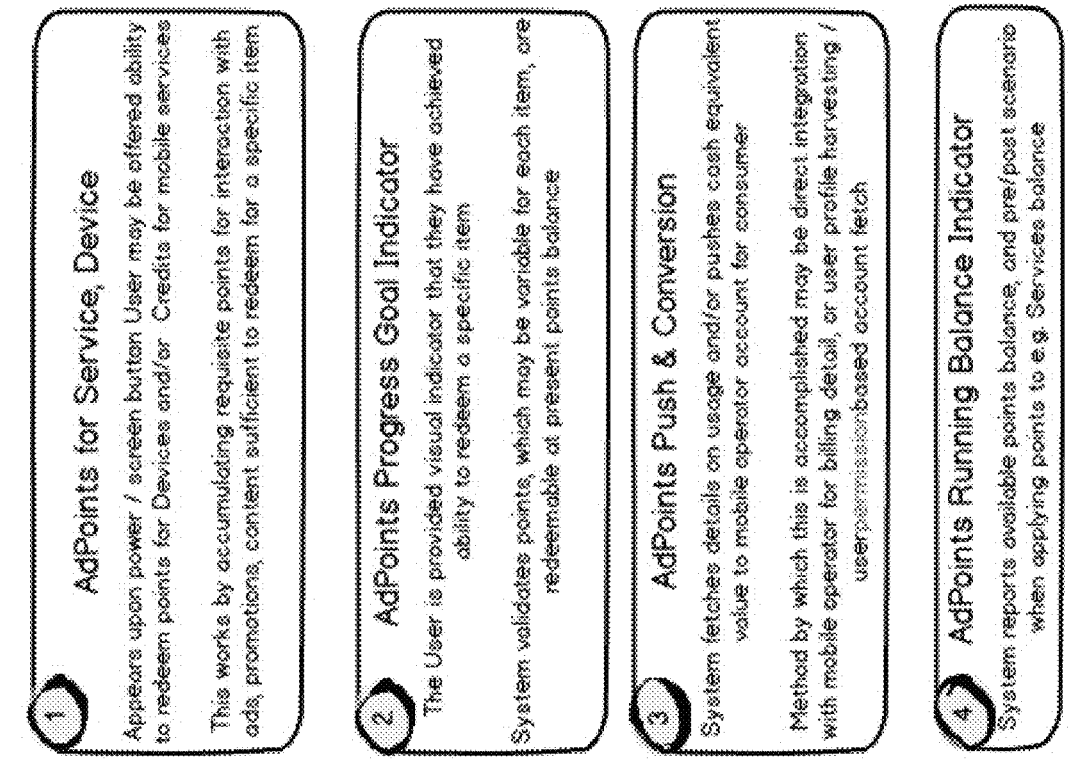
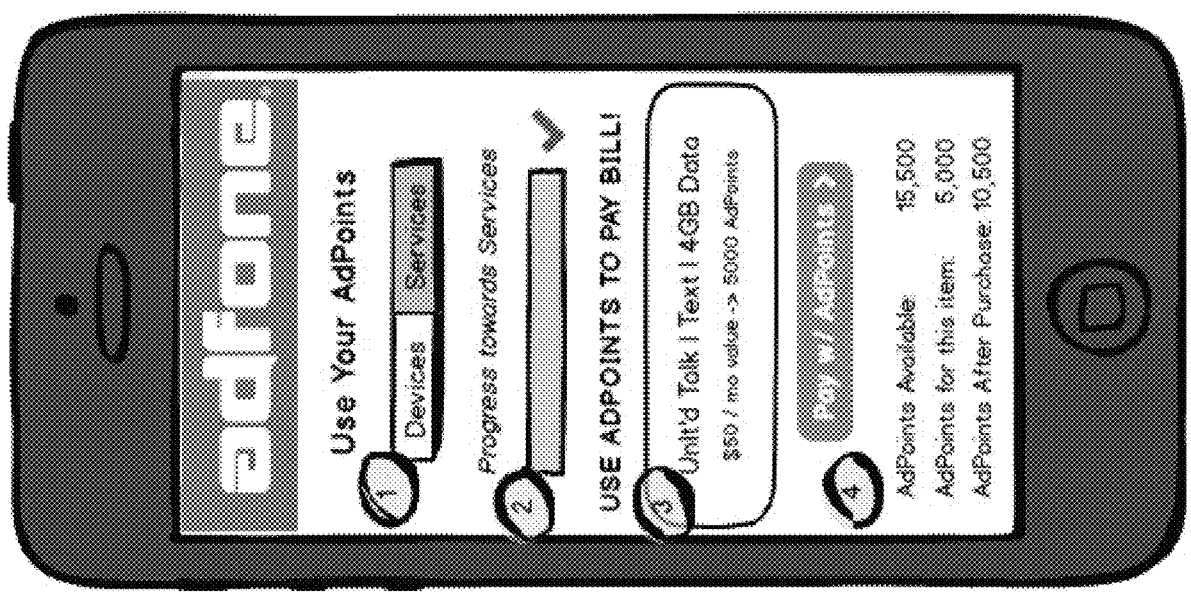
FIGURE 24

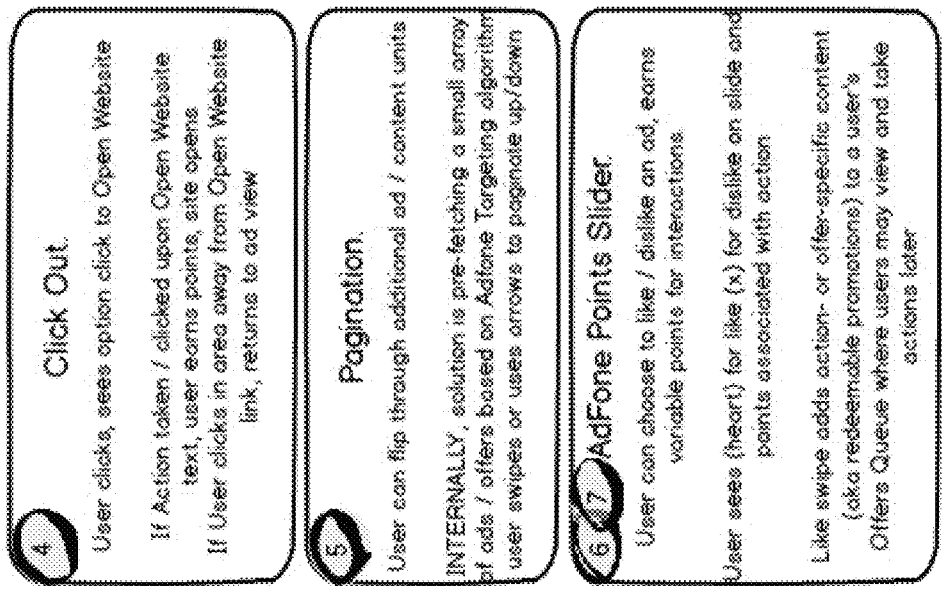
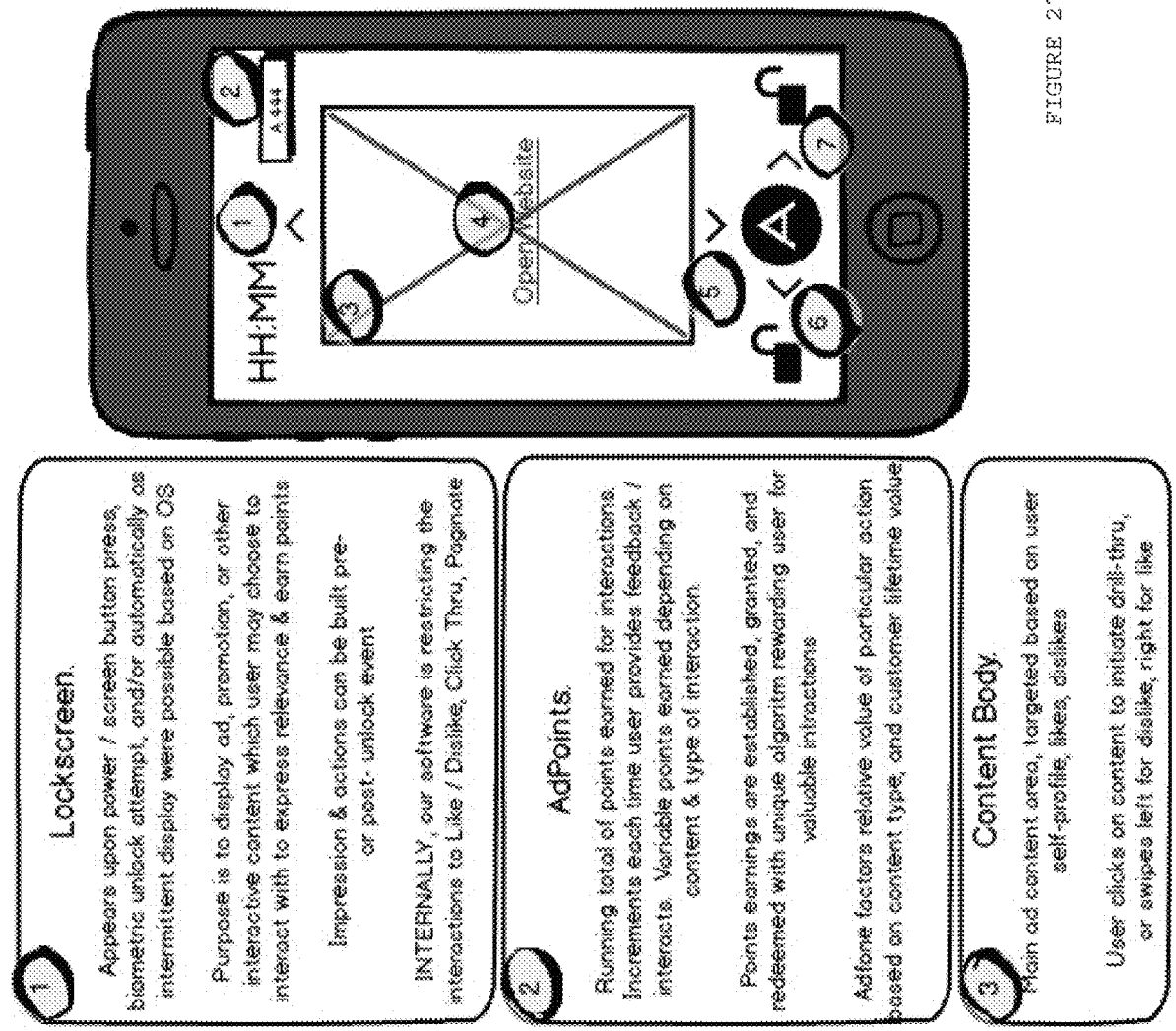
FIGURE 27

CONTINUOUS REWARDED FEEDBACK SYSTEM AND METHOD TO IMPROVE AD TARGETING ON A MOBILE DEVICE

This application claims the benefit of and priority to U.S. Provisional Patent Application Ser. No. 62/157,643, filed May 6, 2015, which is incorporated by reference in its entirety for all purposes.

1. FIELD OF THE DISCLOSURE

The disclosure generally relates to advertising for mobile device and particularly to improving ad targeting on mobile devices.

2. BACKGROUND

Methods in which advertisements are presented on a mobile phone are based on embedding within a portion of a mobile web page or mobile application. One issue with this approach is that these ads are often buried and obscure can have poor visibility to the user of the mobile home. Consequently, these ads are often ignored by the user. The system and method disclosed herein is directed to addressing these problems with current mobile phone advertising.

SUMMARY OF THE DISCLOSURE

A system and method which includes a downloadable application for a mobile device is generally disclosed and used to force a user to view targeted advertisements on their mobile device in order to gain access to use of the mobile device. The ads appear on a lock screen of the mobile device upon powering up or waking up of the mobile device. The user can take one of several actions with respect to the displayed ad and upon such action the screen is unlocked and the user is provided with full function of the mobile device. The user can be incented for each action through the accumulation of points which can be used towards paying the user's phone bill or for other purchases or the user can receive other rewards.

An advertisement/promotion/offer is displayed on a lock screen for the mobile device. In order for the user to access the functions of the mobile device, he or she must first interact with the advertisement displayed on the lock screen. The downloaded mobile phone application takes control of the mobile user experience at the operating system level such that it can preferably always be running in the background and automatically presents targeted advertisements to users upon the occurrence of a power/wake up event. Thus, the described system and method allows targeted advertisements to be presented virtually immediately upon the occurrence of a power/wake up event and before other applications or functions are permitted to be launched by the user or executed at the operating system level. Accordingly, the downloaded software application of the current system and method becomes the dominant software application on the mobile phone, until the user interacts with the displayed targeted ad, Thus, in use the consumer is presented with a lock screen ad, requiring feedback from the user in order to move beyond the lock screen. With the disclosed system and method, the consumer must respond to the displayed content before they are permitted to move forward with the phone (mobile device). The forced actions/feedback can be an indication of an interest or additional interest or non-interest in the displayed ad.

The system records all of the user's actions with respect to the ad and along with the user's initial set up answers and other supplied answers and responses, determines targeted ads customized for the user.

In one non-limiting embodiment upon powering/waking up the mobile device, the following can occur:
1. User wakes phone (mobile device) from sleep state by accessing phones lock screen
2. User is presented with a targeted preferably full screen, high res, advertisement
3. User can engage with the ad through swiping like or dislike to provide user's interest or disinterest with the ad
4. Each swipe can be recorded/scored and stored and used for creating and updating the users' profile for determining which type of ad content to send to the user's device for future ads.
5. The described mobile phone application learns from each swipe and via a proprietary algorithm uses the learning to improve the recommendations of future ads such that they are more targeted
6. The more the user uses the system, the more targeted the recommendations become until the system is able to make recommendations at a relatively high accuracy level
7. Upon each swipe the user earns points as an incentive.

In a preferred, but non-limiting, embodiment, the technology can include the following:
1. A front end software application which is preferably downloaded by the user or preloaded on the mobile device prior to purchase by the user;
2. Algorithms, intelligence and/or business rules which can be used to determine and improve the targeting of the ads;
3. A connection to a third party ad serving platform; and/or
4. The ability for an advertiser to directly upload their own ads and business rules The preferred technology behind the mobile phone app in one embodiment can form part of a broader proposition to mobile consumers and advertisers whereby the users earn points which can be redeemed for various devices and/or services. By automatically triggering advertisements to the user based on predetermined user actions, the end users can become more valuable to advertisers as they are in effect opting-in and incentivized to receive the ads. The end users will benefit by having an incentive to consume the advertisements in the form of desired rewards of meaningful monetary value. Thus, the novel technology of the above-described mobile phone app allows both the end users and advertisers to benefit accordingly.

BRIEF DESCRIPTION OF THE DRAWINGS

FIGS. 1 through 27 illustrates various block diagrams, screen shots and process flow diagrams for the novel system and method providing continuous rewarded feedback in order to improve ad targeting on a mobile device.

DETAILED DESCRIPTION

Figure 1:
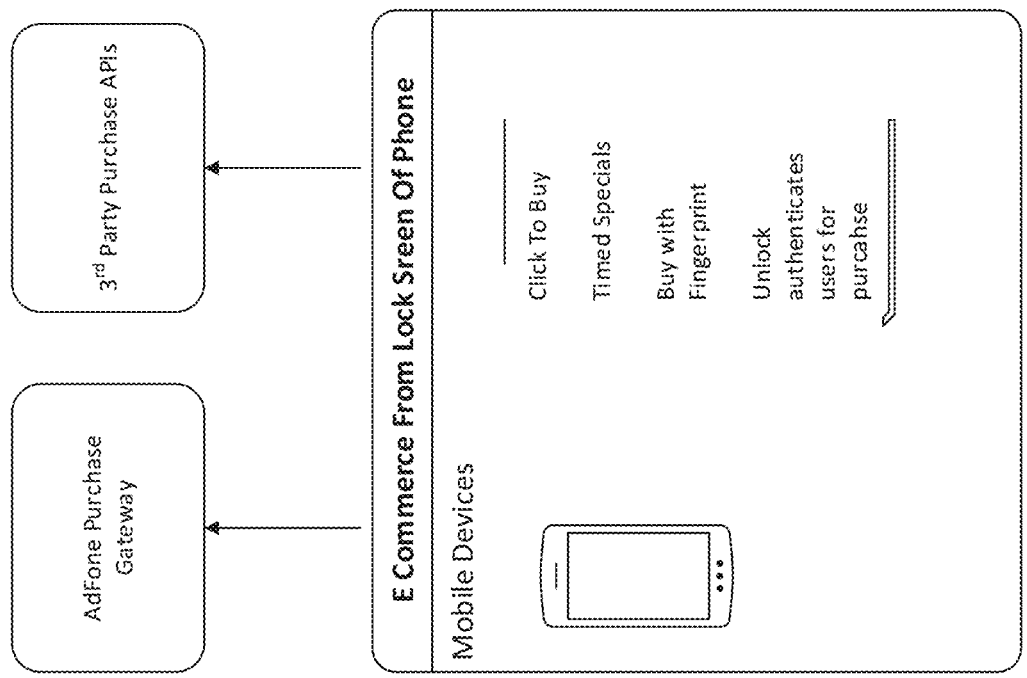

Described is a system and method for improving ad targeting on a mobile device. A software app is downloaded on the mobile device, which creates a cause and effect relationship between the users' actions each time the mobile device is powered up, woken up, etc. (collectively "Event" or "Events"). Each time an Event on the mobile device occurs, an advertisement is displayed on a lock screen for the mobile device. In order for the user to access the functions of the mobile device, he or she must first interact with the advertisement displayed on the lock screen. The downloaded mobile phone application takes control of the mobile user experience at the operating system level such that it can preferably always be running in the background and automatically presents targeted advertisements to users upon the occurrence of an Event. Thus, the described system and method allows targeted advertisements to be presented virtually immediately upon the occurrence of an Event and before other applications or functions are or are permitted to be launched by the user or executed at the operating system level. Accordingly, the downloaded software application of the current system and method becomes the dominant software application on the mobile phone, until the user interacts with the displayed targeted ad, which will be described in more detail below. As a non-limiting example, when the user wakes up the mobile device from sleep mode or powers up the mobile device, a full screen static banner ad can be displayed on a lock screen of the mobile and remains locked and requires the user to interact with the displayed ad before being permitted to access the mobile device's home screen. Mobile device can be defined as a smart phone, cellular phone, table (e.g. iPad, etc.), laptop, notebook or any other mobile electronic device and all are considered to be within the scope of the disclosure.

Thus, in use the consumer is presented with a lock screen ad, requiring feedback from the user in order to move beyond the lock screen. With the disclosed system and method, the consumer must respond to the displayed content before they are permitted to move forward with the phone (mobile device). The forced actions/feedback can be an indication of an interested or additional interest or non-interest in the displayed ad. Input from the user can be achieved by several methods. In one embodiment, the input can be achieved by the user swiping the screen one way/direction (i.e. to the right) for an affirmative indication or swiping the screen in a different way/direction (i.e. to the left) for a negative indication. The user can also select or press icons or symbols appearing on the screen with the ad as an alternative or additional way of inputting his or her response to the displayed ad. Other types of actions from the user can also be recognized by the software application running on the mobile device as a triggering event to send a signal/instruction for unlocking the screen. For example, the user can press or select a "buy" button which can direct the user to a separate purchase page for the product displayed in the ad. The software application can be configured to also equate a "buy" action as also a favorable response by the user. Preferably, receiving a plurality of fast responses (e.g. 100+ times per day—though not limiting) can give the system an autonomous look into the consumer's personality through the use of personality profile tests driven by this fast feedback mechanism.

As mentioned above a purchase typically represents a strong indication of a user's favorable interest for the displayed product. As such, the system and method are designed such that the consumer can be presented with purchase opportunities, timed specials and other purchasing events targeted to their interests and targeted to different times of day to leverage frictionless buying opportunities As a non-limiting example, the system and method can inform the user that it has been two weeks since they last purchased cat food, display/show the cat food ad and reminder on the screen of the mobile device and allow them to buy the cat food with seamless authentication to create and leverage impulse buying decisions. (See FIG. 1).

FIG. 1 is illustrates a block diagram of the user's experience when using the novel system and method for improving ad targeting on a mobile device from the lock screen of the mobile device. Generally, each time the mobile device is powered up, opened up from sleep mode, etc. an initial lock screen is displayed containing the targeted ad. Before, the user can access his or her phone, the user must interact with the targeted ad. Thus, the user is forced to interact with the targeted ad. The more interactions performed by the user, allows the system and method to learn more about the user, such that the ads displayed become more and more specific and/or customized to the particular user. As seen in FIG. 1, eCommerce can also be conducted at the lock screen displayed ad by the user and the system and method can be provided with a click to buy feature or buy with fingerprint feature. Timed specials can also be presented to the user. The mobile device can be in communication with a purchase gateway associated with the operators of the system and method (sometimes referred to as "Adfone" herein or in the drawing figures) and in communication with $3^{rd}$ party purchase APIs (application program interfaces).

Figure 2:
Figure 3:
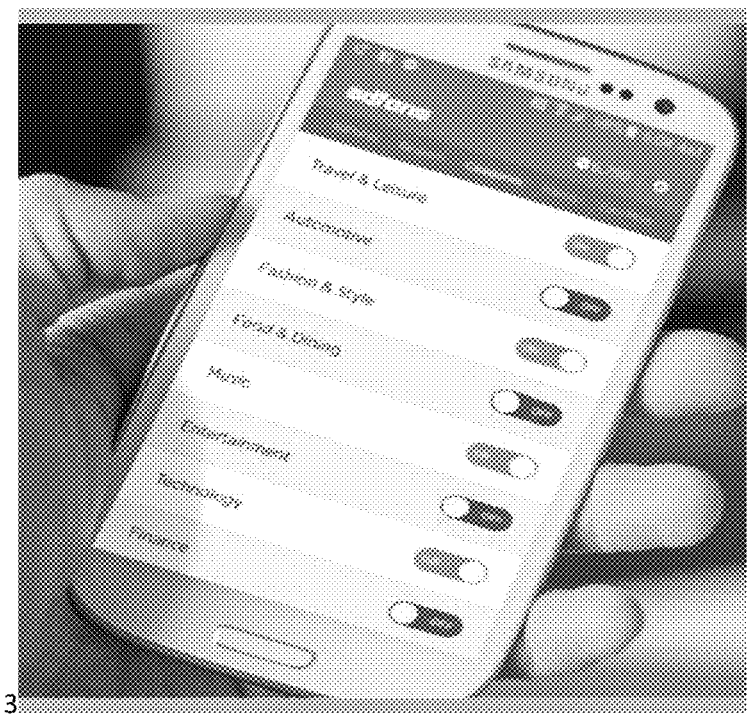
Figure 6:
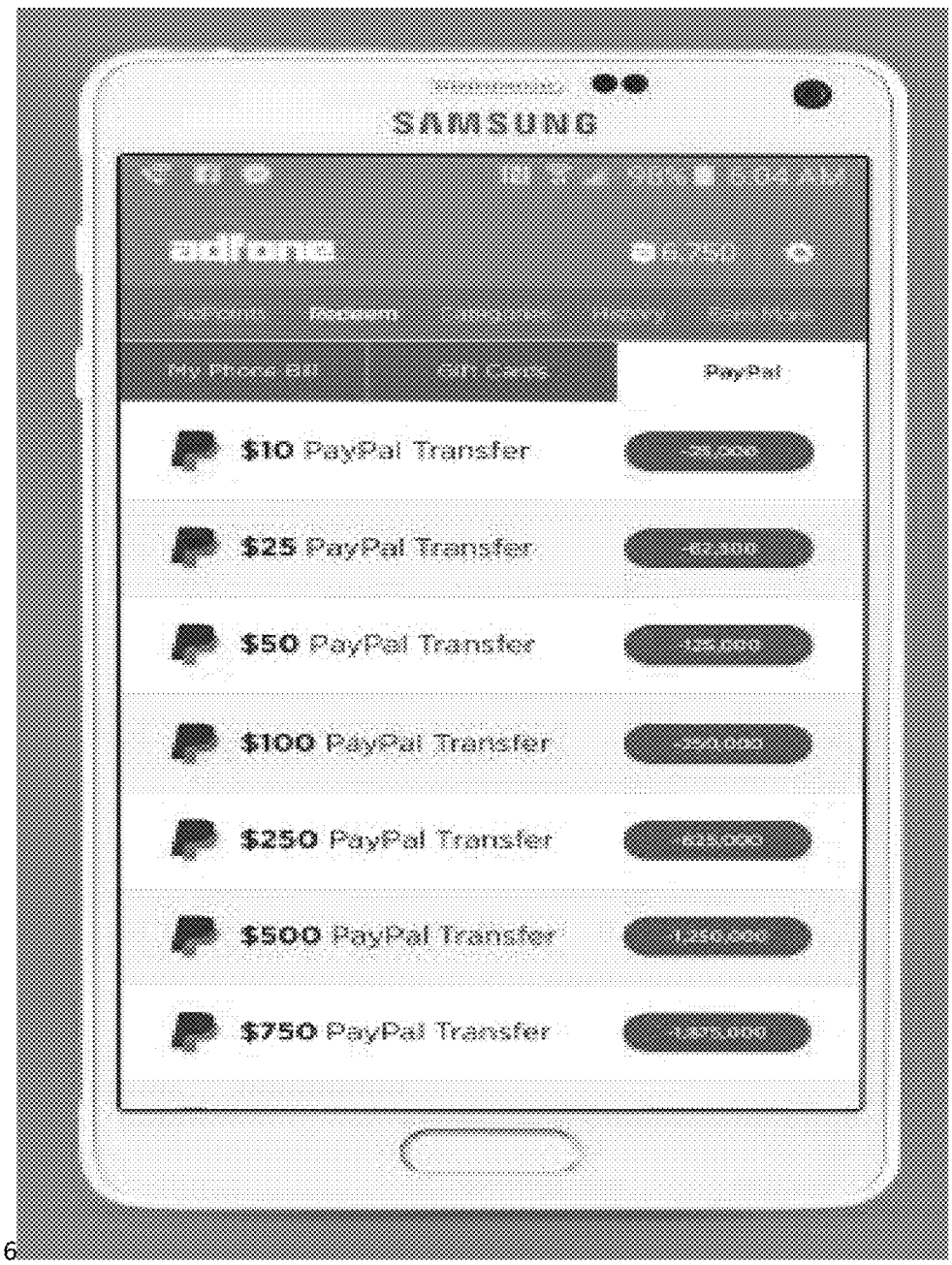
Figure 6A:

FIGS. 2 and 3 illustrated two non-limiting set up screens for setting up a profile for the user/customer/consumer. Initially, the user downloads the novel software app of the system and method to his or her mobile device. For initialization, the consumer preferably is given a series of profile building questions in order to establish a baseline for the consumer. These profile building questions can be considered part of the initial setup and activation of the downloaded app and/or the mobile phone. The consumer can also be prompted to identify areas of interest (e.g. travel & leisure, automotive, pets, fashion, etc.) (See FIG. 3). This initial setup can be considered a setup wizard. The more information regarding the user that is known by the system and method the better the targeting of the ads that are presented on the user's mobile device. For the progression of content serving, the consumer can be presented with a series of ads, images, videos, purchasing opportunities (i.e. snap sales), surveys and questionnaires. Based on the user's feedback and answers to this progression of information, the consumer is provided increasingly targeted content at the lock screen up wake up or powering up of the mobile device. FIG. 6a illustrates alternative or additional ways that user profile questions can be presented to the user. As seen in FIG. 6a a series of questions are provided to the user, answering "yes" (i.e. clicking the check symbol or swiping right, etc.) to the first questions preferably causes a specific next question to appear for answering by the user. Similarly, answering "yes" to the second question causes a specific additional question to appear for answering by the user. Likewise, had the user answered "no" (i.e. clicking the X symbol or swiping left) a different specific question can appear for answering by the user.

Figure 4:

As seen in FIG. 4, the downloaded app allows the user to determine the number of ads that he or she wishes to be presented with for a predetermined time period (e.g. per hour, per 24-hour period, etc.). Thus, the user can control the volume of content he or she is presented with for the predetermined time period. As seen in Figure, the consumer can dial in the amount of advertising they wish to view for the predetermined time period (e.g. 24-hour period).

Preferably, the advertising and the response to the advertising is incented. In one non-limiting embodiment, the reward provided to the user is the subsidizing the costs of the phone and services for the mobile phone that the app is downloaded on and/or potentially purchases made by the user with mobile app, such as, but not limited to, purchases made from the displayed ad (i.e. click to buy feature, etc.). The higher the ad flow, the higher the monetization opportunities and incentives for the consumer. Accordingly, this feature of the app can be controlled by the consumer, as he or she determines the number of ads that will be shown during the predetermined time period.

Figure 5:
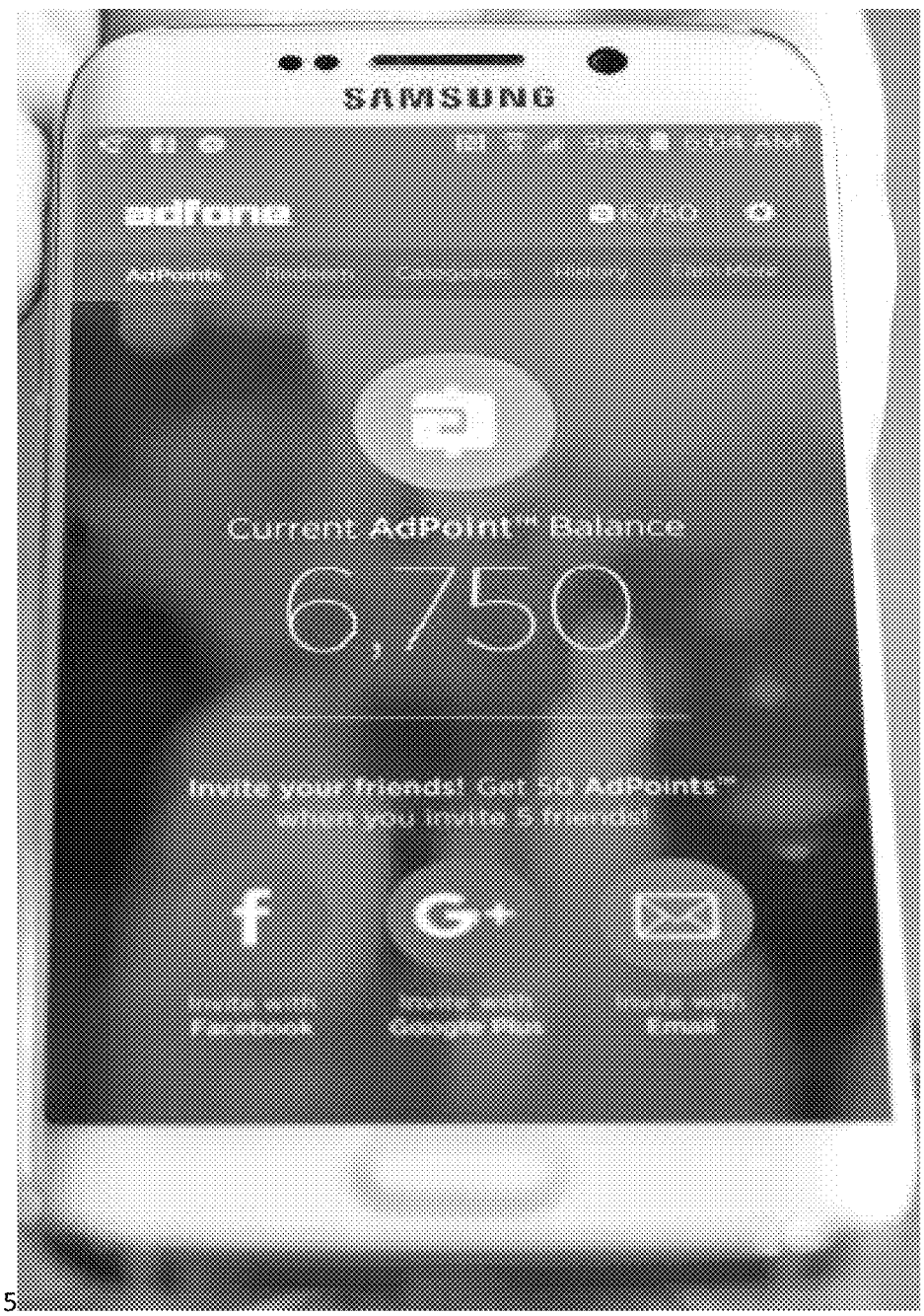

Preferably, the consumer is incented with points or other rewards, which as a non-limiting example is shown in FIG. 5 as AdPoints. The points/rewards can be used to redeem discounts on services such as subsidizing the consumer's phone bill (i.e. the phone bill associated with the mobile device, etc.) or obtaining a consumer good s (e.g. gift card, etc.). The consumer is incented with points/rewards, which can be used to redeem discounts on services such as subsidizing their phone bill or obtaining consumer good s (e.g. Starbucks gift card). See FIG. 6.

FIG. 7 illustrates a block diagram for a global perspective of the various components and participants for the disclosed system and method. Generally, information on the content served combined with the user responses is fed to the system's artificial intelligence ("AI") for driving consumer profiling. The system's operating system ("OS") level technology leverages the artificial intelligence and incentivized direct user profiling technology to collect user interests, demographics and purchase intent, to create novel consumer insights and valuable audience segments to drive better conversions and return of investment for advertisers, such as, the advertisers whose goods and/or services are displayed on the lock screen.

Feedback from the consumer/user, including, but not limited to, click throughs, likes, purchases can be used to build a consumer pattern for the consumer/user. Thus, consumer patterns can be based on, ad feedback, actual purchases and GEO/Socio information, as well as other relevant information. This consumer pattern can lead to consumer grouping. For example, the system can analyze the consumer pattern information and make further determination. As a non-limiting example, where the system determines that where the consumer likes the following five ads, the system predicts or expects that the consumer will also like these three ads and such ads are selected by the system for displaying on the user's lock screen. Thus, the more information and feedback received from or about the user/consumer, the more accurate and targeted the subsequent ads become for the specific consumer/user.

Component 7.1 represented $3^{rd}$ Party Ad Serving which can be a third party ad serving API hiding a computer platform (e.g. mobile advertising (ad) serving system, etc.). The Adfone system pulls ad content from the mobile advertising serving system. Preferably, the Adfone system pulls the ad content ahead of time and buffered to minimize display delays on the client/user mobile devices.

Component 7.2 represents an electronic database of Ads, which can be a relational database with blob storage used to store content and images including but not limited to still, video and animated ads, survey sequences, etc.

Component 7.3 represents the system's (Adfone) own intelligent ad serving, which can be the system own proprietary and serving platform. Though not considered limiting, the platform can be built upon current image serving platforms. The platform/ad serving will allow for the uploading, tagging, distribution, tracking and invoicing of ad content. The electronic database 7.2 can be in communication with both the $3^{rd}$ party ad serving 7.1 and the Adfone intelligent ad serving 7.3

Component 7.4 represents computer systems of ecommerce trading partners which can be third party companies.

Component 7.5 represents AP and OS level software on the mobile devices of the users/consumers. The downloaded Adfone app includes routines that enable the lock screen feature and ecommerce capabilities described herein.

Component 7.6 represents the system's (Adfone) proxy serve. The proxy servers allows tracking of all internet interactions from the mobile devices.

Component 7.7 represents the system's (Adfone) AI metering and reporting. Preferably the system's AI can be cloud based and captures ad, survey and ecommerce transactions performed by the consumer/user for analysis, learning and intelligent targeting of additional (subsequent) content to be displayed on the user's mobile device based on profiling of the user from the information collected about the user.

Figure 8:
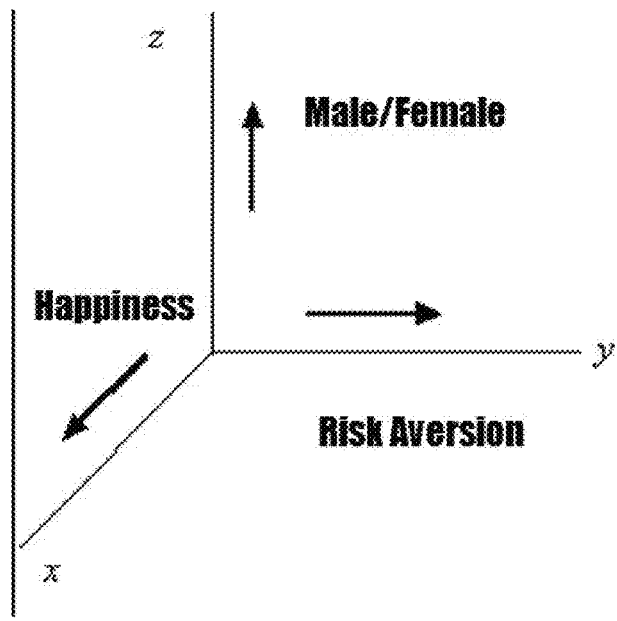

The system's AI/Machine Learning can be used to build a virtually perfect snapshot of a consumer's profile related to the user's interests and purchase intent. To understand interest intent, the system can both directly ask the user as well as infer from the user's responses, habits or actions. The models used by the system can be driven with the AI/machine learning application of the system. The application can study 3 to 4 orthogonal and independent dimensions to personality, including a male/female proxy, a risk/testosterone index, a happiness quotient and a socioeconomic index. (See FIG. 8).

Figure 9:
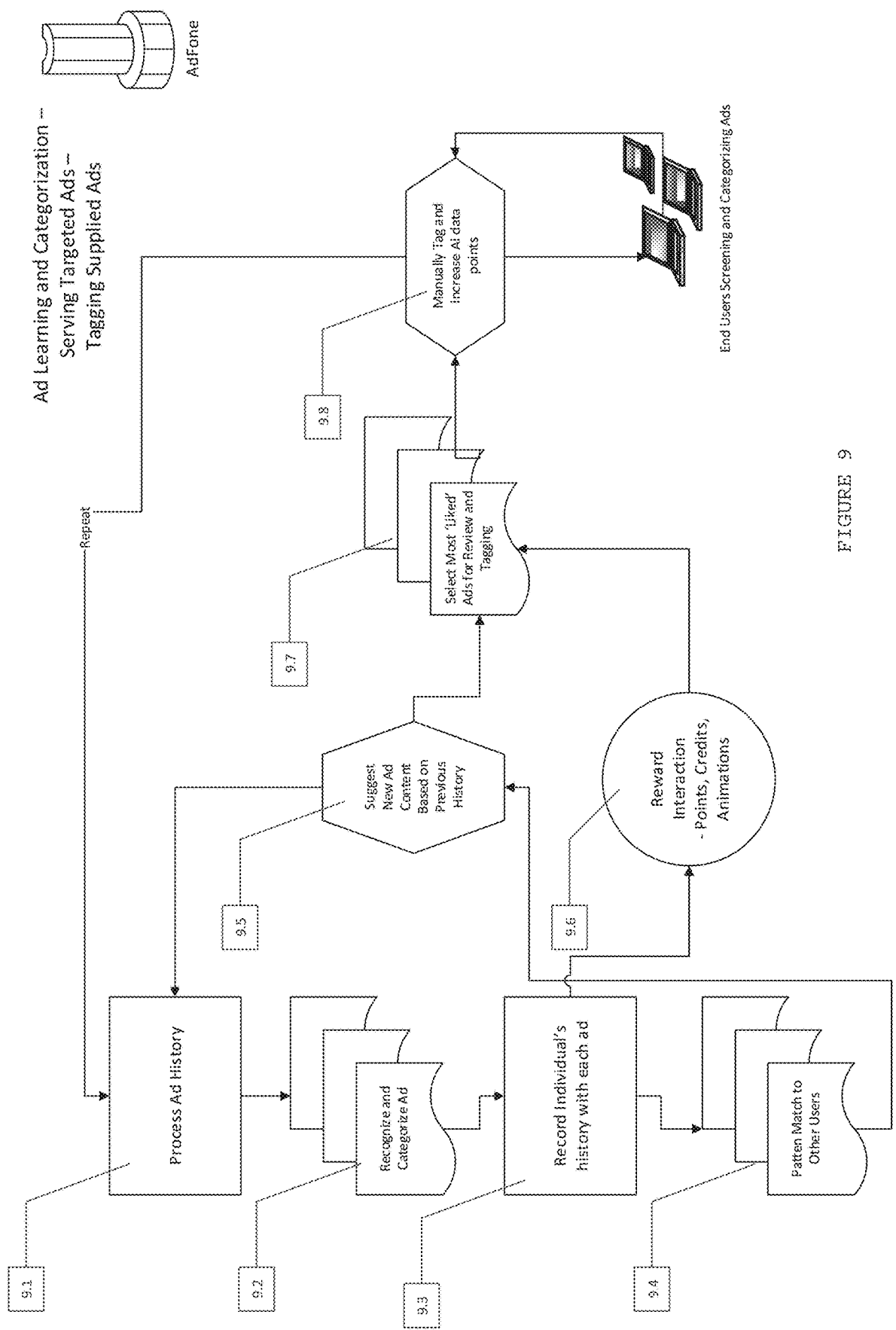

FIG. 9 provides a block diagram and process for for ad learning and categorization used for serving targeted ads and tagging supplied/displayed ads. The data gathering collected to build the consumer data profile for the user allows for the ads to be specifically targeted for the user's profile. As mentioned above, much of the information obtained/collected for creating the profile, is received from forced responses (i.e. screen swipes, etc.) from the user reacting to ads and/or surveys appearing on a lock screen for the mobile device, which is required before the user is provided full access to the features and functions of the mobile device.

The system will allow for quick driving of top line revenue numbers for company's placing ads for the system. As a non-limiting example, a car company may wish to correlate showroom visits and vehicle purchases to the company's ads displayed by the system.

As a non-limiting example, Identifying a male risk profile, with high impulsivity on a happy day might prompt the system to display an ad on such user mobile device on a Saturday morning for a discount on a specific "muscle" car offered by the car company, which is available only for a specific time period (i.e. next 4 hours) for visiting a showroom of one of the car company's dealers. Directions to the showroom can also be included, such as by using OS level GPS feedback. Should the user right swipe the ad, one metric of positive feedback is provided. Should the user click through the displayed ad (which can take the user to a website page for the dealer or car company), a higher level of positive feedback is provided. Should the user actually visit the showroom as evidenced by GPS information, a very high level of positive feedback to the AI is provided.

This same setup can be hand crafted for items at multiple socioeconomic levels, with the target item scaled to the estimated buying power, itself a function of demographics, geography, purchase history, etc. Patterns are built and then patterns are matches to other users. (See FIG. 9). Machine learning and AI can be deployed against a test group of known users who have self-identified metrics of interest, and utilize feedback mechanisms to determine which items correlate to the known profiles. In this way the AI is not programmed, it learns, and it gets smarter as the data sets get larger.

Block 9.1 of FIG. 9 represents processing ad history and illustrates the self-learning mechanism capability of the system's AI. Here gathering of the history of transactions/ actions for displayed ads is performed, such as, who the ad was shown to, how the user reacted to the ad, any tagged metadata information for the ad plus the binary hash that identifies the ad.

At block 9.2 the ad is recognized and categorized. Here the ad can be identified by its binary hash and assign a unique number. Also, the prior interactions with this ad across all users can also be accessed.

At block 9.3 the individual's (user-consumer) history with each ad is recorded. The information recorded can be saved in an electronic database. Here all of the user's interactions with the ad can be recorded, which can include, but is not limited to, time the ad was displayed on the user's mobile device, time it took the user to react (i.e. how long was the ad displayed before the user reacted and/or how long did the user view the ad), the actual reaction (i.e. favorable, unfavorable, etc.). Where the user's actions is to save the ad for later or otherwise acted upon, a special note can be recorded. Information recorded can also include, without limitation, who, where and when the user interacted with the specific ad.

At block 9.4 any patterns determined for the individual based on the individual's recorded history can be matched to other users of the system and their patterns. As a non-limiting example, by matching the individual's to other user's similar patterns, the system can determine that if the user/individual likes certain specific ads, they are likely or more likely to enjoy these additional specific ads and more likely to interact (favorable response, click through, etc.) with the additional specific ads Thus, pattern match can be preferably performed using the system's AI self-learning technology.

At block 9.5, based on the individual's specific recorded history from block 9.3 and/or pattern matches to other users in block 9.4, the system can suggest and/or determine new ad content to send to the specific individual/user. Thus, the system can predict, based on patterns to date, a more targeted desirable ad to display on the user's mobile device. It should be recognized that it isn't necessary to understand that the person responds well to a certain specific content (i.e. cat images) if many other users responded to a series of ads with the specific content (i.e. cat images). The AI of the system correlates the uniquely identified ads. However, if keywords for the specific content (i.e. CAT for the cat images) are provided, they can be also matched by the system.

At block 9.6, the user is rewarded for their interaction with the displayed ad. Various types of rewards can be provided to the user for their interaction, including, without limitation, points, credits, animations and other content based on interactions. A non-limiting non-point reward example can include if the individual responds well to cat ads, they can be occasionally sent cute cat video link mixed in with their ads. Another non-limiting example includes providing designs for slot machine like noises and animations as points are earned, bills are reduced, etc.

At block 9.7, the ads determined to be most "liked" by individuals/users of the system are preferably selected for review and electronic tagging. Preferably all ads can be reviewed and tagged. However, where there are limits on the number of ads that can be reviewed and tagged, the system preferably choses the ads based on the ads which received the most "likes" or favorable responses. Preferably, the system includes a software engine for identifying the content that gets the most response for the users. These ads/content are considered the highest priorities for metadata tagging, with the metadata tagging preferably being achieved through a team of Adfone developers and using an Adfone portal.

At block 9.8, the ads/content selected in block 9.7 can be manually tagged with metadata (such as, but not limited to, 5-10 keywords describing the ad. The metadata added to each provides the system's AI with more grist for the mill ("useful material") which can be incorporated into and/or used for the pattern matching. Tag Cloud Analysis can be developed for each user's likes and interests and this data can be fed back to block 9.1 and the process repeated.

Figure 10:
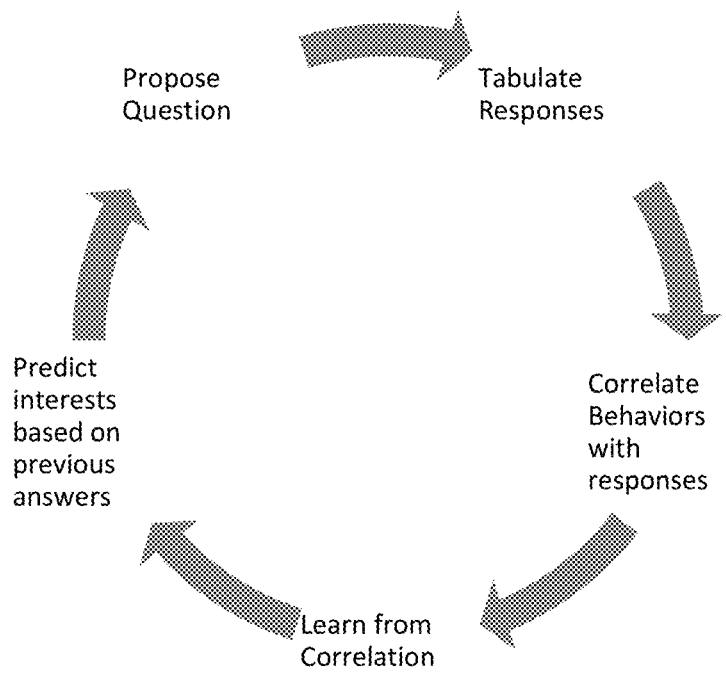

FIG. 10 illustrate the elements that are tested, which can include, without limitation, direct question to the user determine the user's intent, active Ad feedback to profile the user's interests, displaying third party company logo's to the user and scoring the user's responses to ascertain brand loyalty and/or photo scoring and evaluation questions to build a personality profile for the user. FIG. 10 represents a continuing sequence of stages, tasks or events in a circular flow. As seen a question can be proposed for response by the user. The user's response is than tabulate and behaviors are correlated with the responses. The system's AI learns from the correlation and the system predicts the user's interests based on the user's previous answers. This cycle repeats with additional questions proposed to the user.

Figure 11:
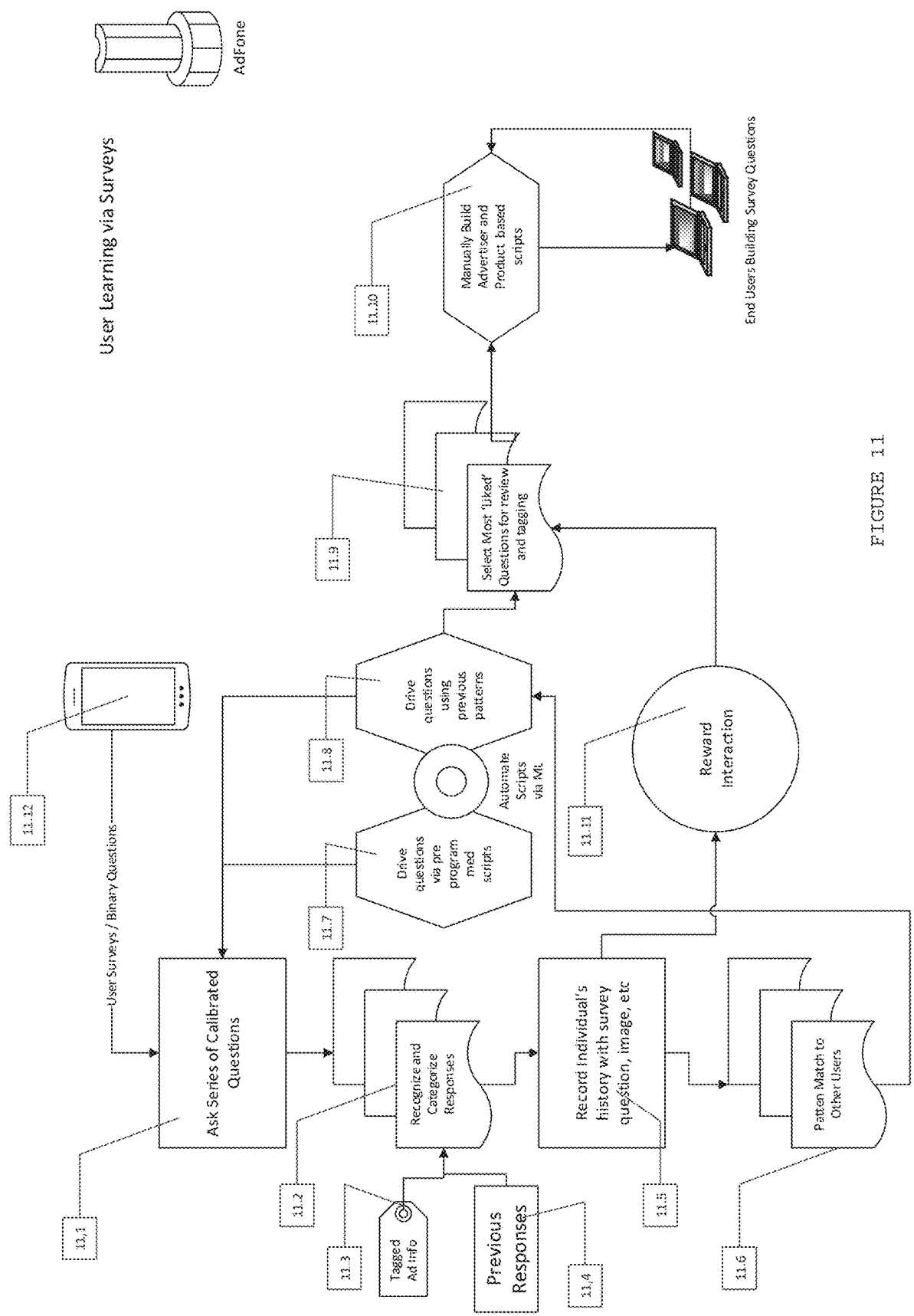

FIG. 11 illustrates a block diagram and process flow for extending the previously described pattern matching to surveys (i.e. hand crafted surveys) and questions intended to explore and target specific consumer area. Once these surveys are crafted, the AI can then learn the response patterns and group those to like consumers, improving content and ad targeting and driving additional surveys.

At block 11.1 a series of targeted calibrated questions can be presented to the user to focus on the users' interests, hobbies, likes, profile. At block 11.2 the system recognizes and categorizes the user's responses preferably by correlating the response, which include providing additional tagged info about the responses (block 11.3), with the set(s) of previous responses.

At block 11.3 additional question info, preferably in the form of metadata, is tagged. Non-limiting examples of additional info where the question relates to dogs can include, without limitation, pertains to dog lovers, small dog lovers, dogs that shed, breed specific, etc.

At block 11.4 any patterns recognized by the system's AI self-learning technology can be matched to previous responses to predict other responses or reactions from the user (i.e. if a user responded to questions 123, 456, and 789, they are more likely to enjoy ad 112 and interact with it. Pattern match this using AI self-learning tech.

At block 11.5, the system can determine new survey questions to suggest to the user based on the user's previous response. The user's responses and/or interactions with the questions presented are preferably recorded in an electronic database. Recorded information regarding the question and/ or the user's response can include, without limitation, the time the question it was displayed, how long it took the user to react to the question, what the user's actual reaction was, etc. Where the question is saved for later and subsequently or otherwise acted upon, information recorded can include, without limitation, who, where and when the user interacted with the question.

At block 11.6 patterns for the user are matched to other users. Here the user's series of survey responses can be matched to previous response patterns of other users.

At block 11.7 preprogrammed scripts can be employed to send questions to the user targeted toward the specific user's data. The user's responses to the initial survey questions can be electronically pulled in and analyzed by the system to determine which preprogrammed scripts to launch. An entire series of questions as an object to be profiled.

At block 11.8 questions are driven/sent to the user based on previous patterns. The system's AI predicts, based on patterns to date, a more targeted survey for the consumer. Here it isn't necessary to understand that the person responds well to questions for a specific topic if many other users have already responded to a series of questions about the specific topic. The system's AI correlates the uniquely identified questions. Where keywords are provides for the specific topic/question, they can also be matched. Thus, the system's software engine is programmed for identifying the content that gets the most response and these identified content can be set as the highest priorities for further questions.

At block 11.9, preferably at least the most "liked" ads are selected and manually tagged with additional metadata. The system's AI is provided with more useful information for its pattern matching determinations by adding metadata and additional content to each question script for the selected ads/questions. Tag Cloud Analysis can be developed for each user's likes and interests and this data can be fed back to block to step 11.1 to repeat the process.

Additional scripts can also be built including questions developed by in house developers and using the Adfone's system portal.

Customer data profiles can be used to create segmented audiences and deliver targeted ads to those audiences. Without limitation, segments can include: social graph audience including identifying risk based on social connection, geographic audiences based on data mining of GPS data to provide roaming areas, socioeconomic audiences based on purchase history, behavioral profile based audiences and/or traditional or standard groupings such as gender, interests and/or age profile.

The AI of the system can provide feedback to the community being sampled. As a non-limiting example: What kind of architect are you? The system's AI can pair the user's preferred architecture styles with their profile elements and the AI can provide entertainment and information to the user about that most interesting of subjects, oneself (i.e. the user). As further non-limiting examples, an occasional game of "what are you thinking—twenty questions" or understanding when the user has leisure time for more interaction with the AI can make the experience more engaging for the user. Additionally, the use of screen saver images to heighten brain stimulation can also play a part in engaging the end users of the system's AI. Polling and voting (e.g. will Trump be President, etc.); with its returned information about total results, can also be of value. All of these types of games and incentives for user participation can be incorporated into the user's experience with his or her mobile device, while providing valuable information to the system's AI.

Figure 12:
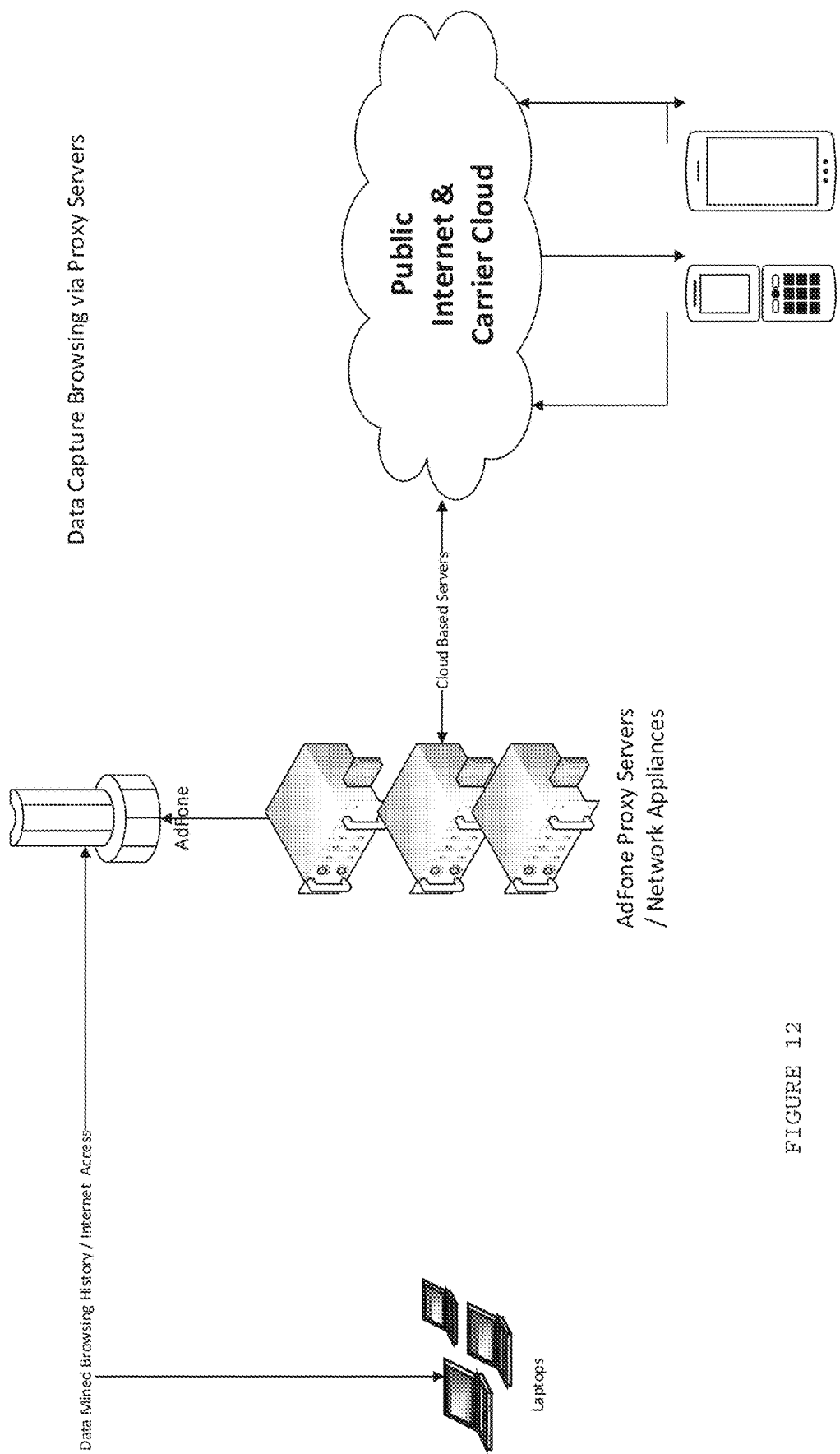

FIG. 12 is a block diagram of the operating system integration/data flow in accordance with the disclosed system and method. This particular application is applicable where the software application that provides the functions of the disclosed system and method are not provided as a downloadable app on the mobile device, but rather where the software application is incorporated or is part of the mobile device's operating system integrated platform. In such embodiments, proxy servers can be inserted into the internet data streams, thereby allowing the AdFone system and method visibility into all surfing, browsing, purchasing made by or from the device, which can provide more information and intelligence to the AI of the system regarding the user for determining which ads to send to the user (e.g. targeted advertising).

Figure 13:
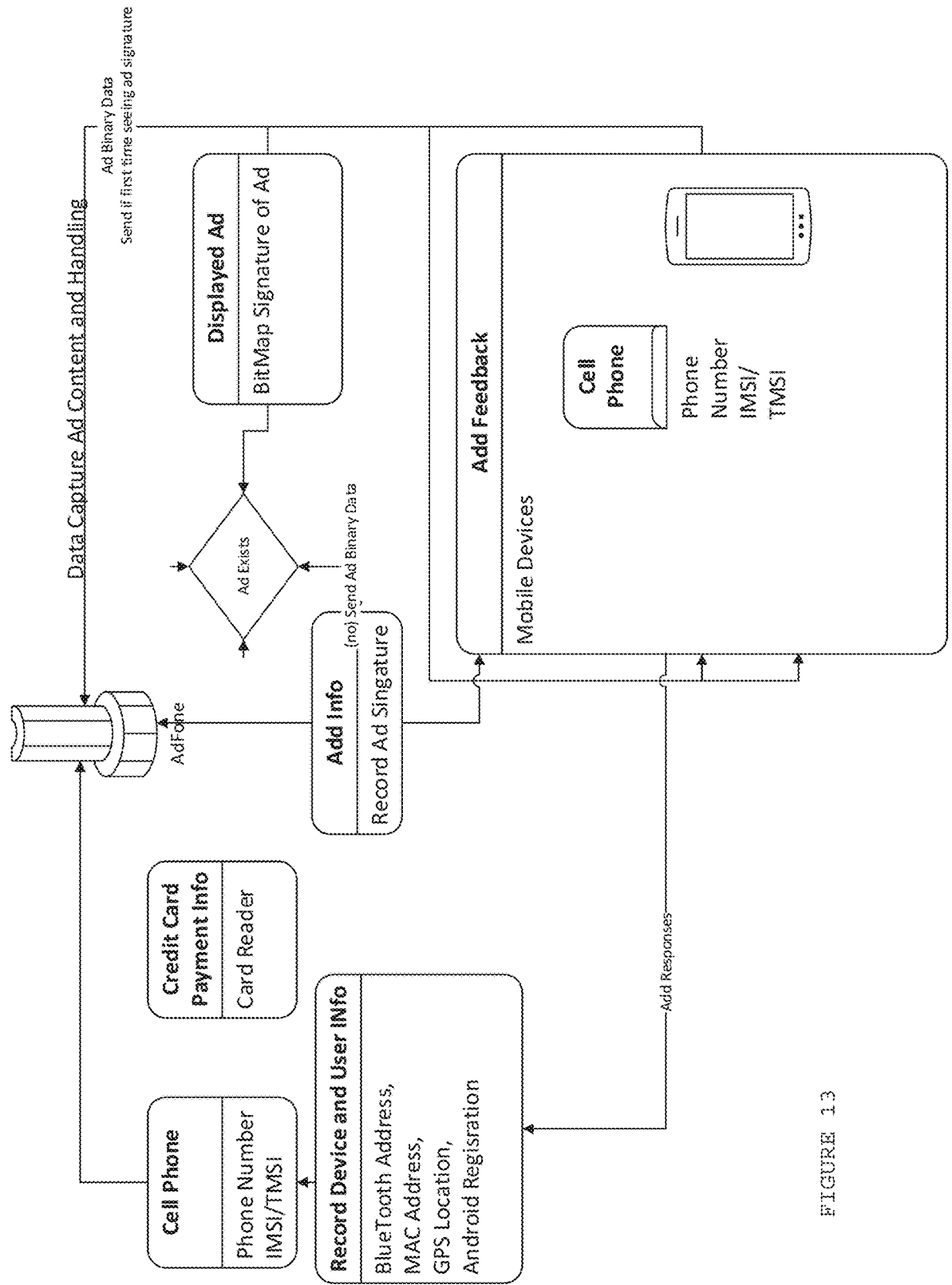

FIG. 13 illustrates a block diagram for ad serving and content management. Understanding the individual presented ads aid with the AI learning. This understanding can come at three non-limiting levels: (1) uniquely identifying an ad and quantifying each user's reaction to that ad. This can be considered the baseline; (2) understanding the content of the ad by both electronic/mechanized and human interventions and (3) building a rich database of related and correlated ads.

Figure 14:
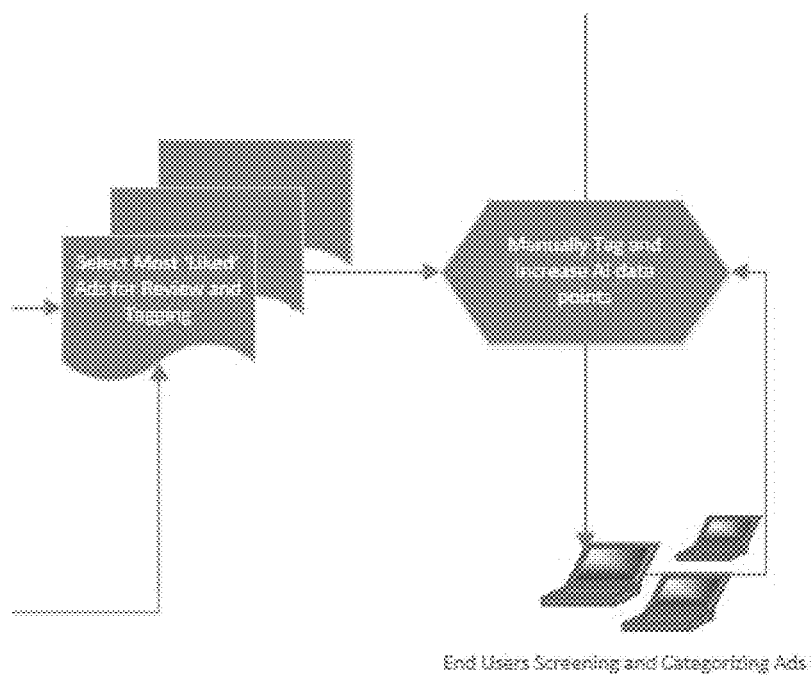

FIG. 14 illustrates a block diagram for tagging an ad. Here the mobile device generates an electronic signature for each displayed impression. The electronic signature is sent to the system's AI preferably via a web service call. If the signature is known, that state is returned to the mobile device and the mobile device continues to record user interaction with the image and sends the recorded interaction information along. If the electronic signature is not known (i.e. first time the ad is being shown to a user of the system/method), the mobile device can send the entire binary stream to the system's AI, thereby providing a displayable actionable copy of the image. The stored image may then be manually reviewed and tagged. Some non-limiting benefits provided include reducing bandwidth consumed by the mobile devices—transmitting a CRC style code rather than the actual binary stream—and enabling pattern recognition on the ad content.

Figure 15:
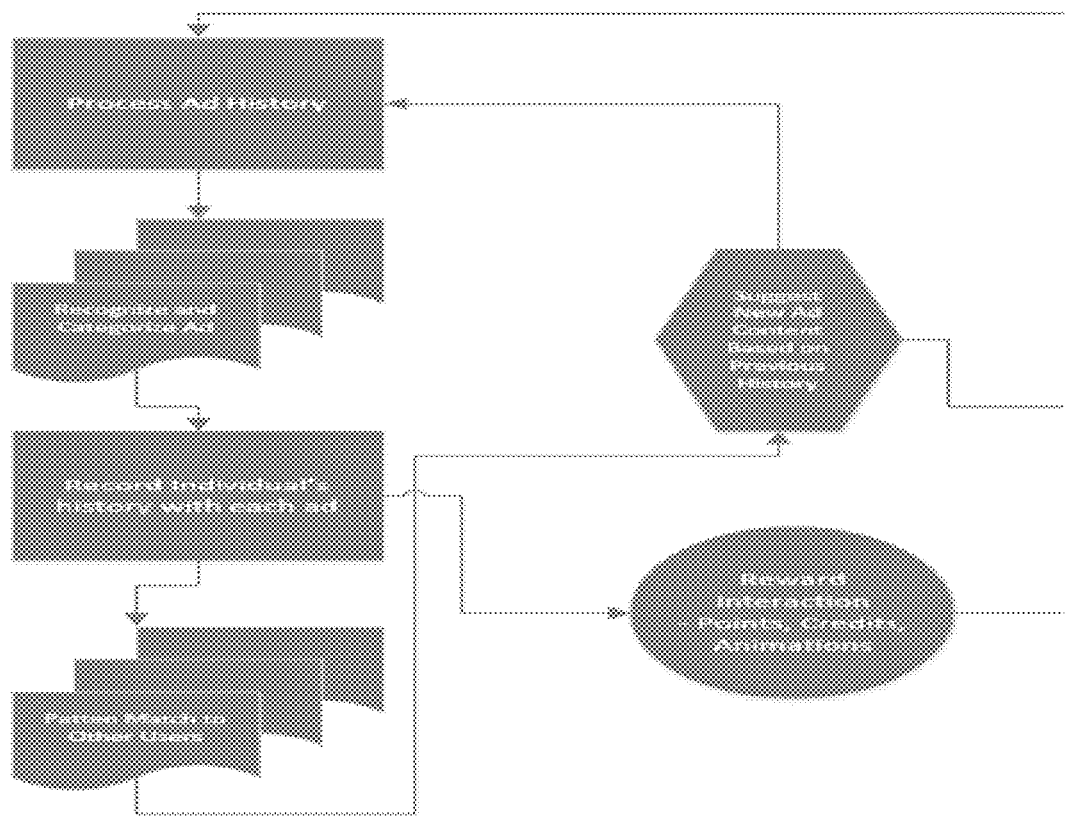

FIG. 15 illustrates how an add is process and categorized by the system and method. In priority order of the ads getting the most user interaction, ads will be displayed to both human (preferably teams of individuals that generate key tags—keywords for the ad) and non-human agents/electronic technology (image recognition AIs) for categorization.

Figure 16:
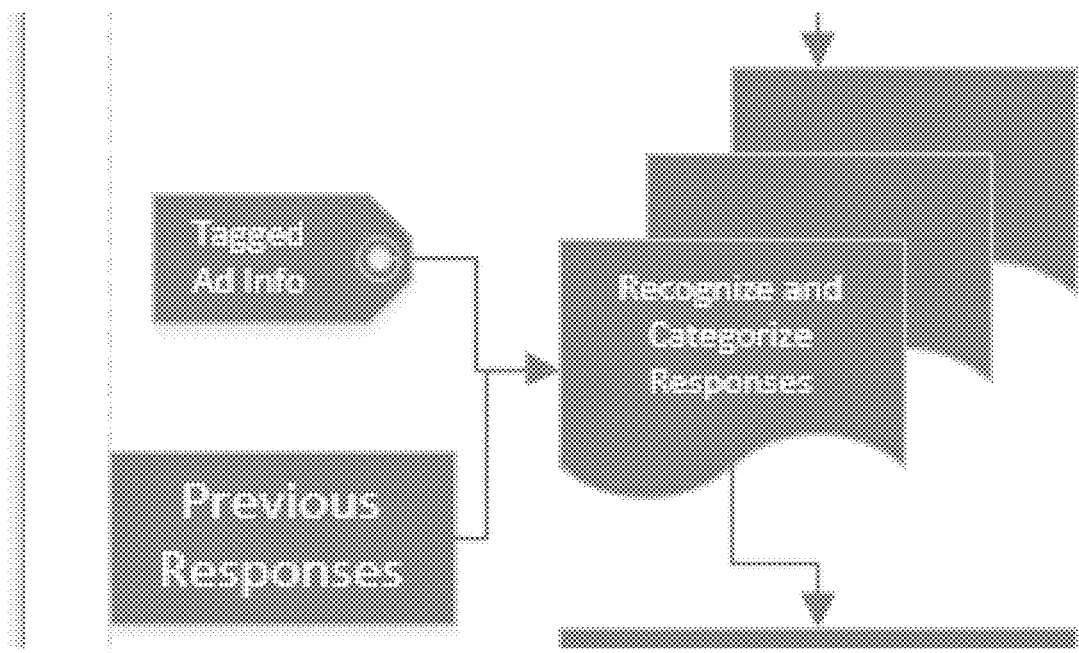

FIG. 16 illustrates how ads can be correlated by "like" responses and by knowing user profile types (e.g. dog owning adventurers like this ad) and then further refined by tag knowledge of the ad (this ad is for big dog dog food showing active dogs in an outdoor setting). The electronic tags increase the richness of the AI correlation but are not required to make correlations. Correlations of non-tagged ads are inferential, and, thus, will not be as accurate. However, the correlation of non-tagged ads are considered within the scope of the disclosure.

Figure 17:
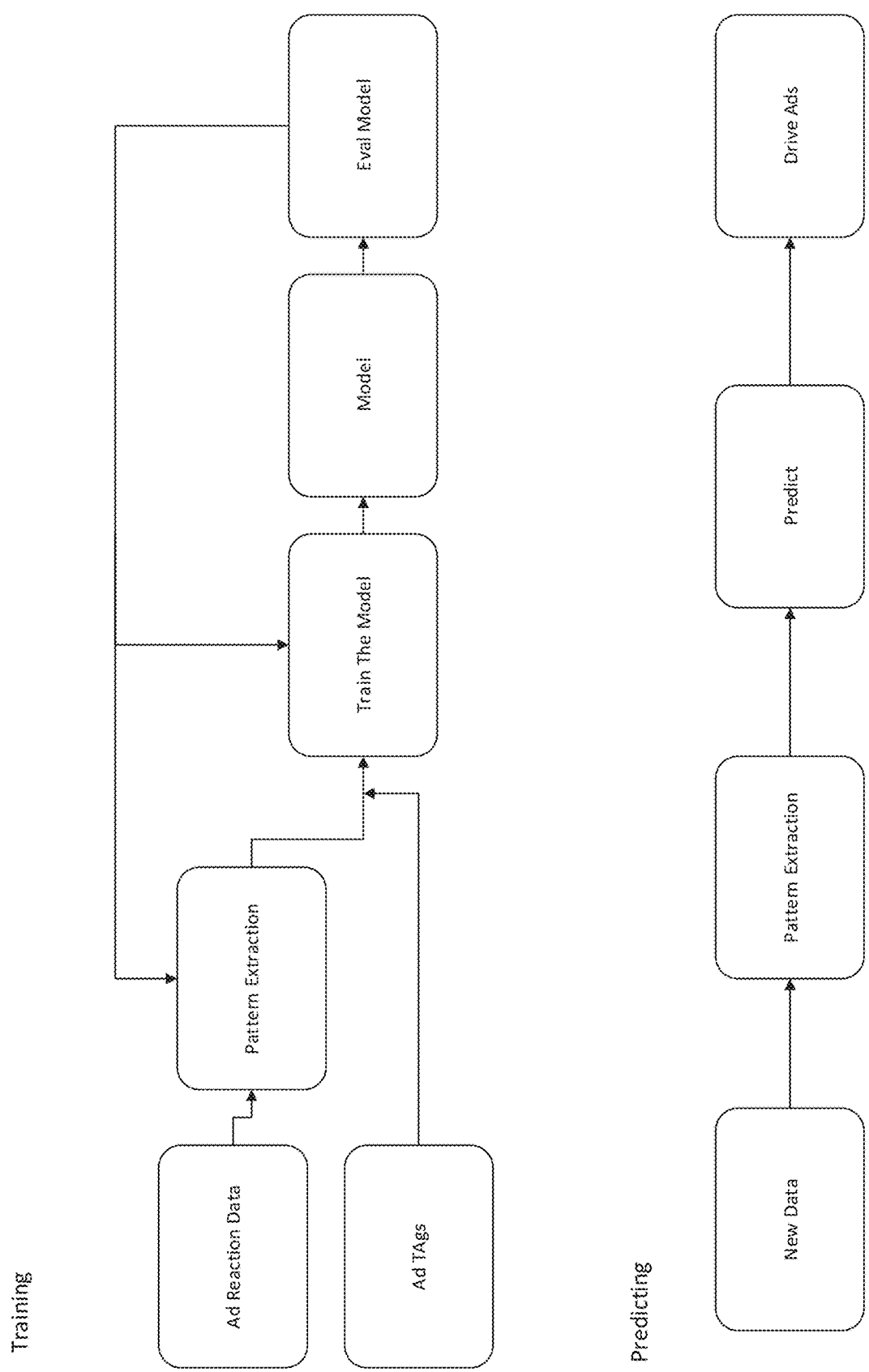

FIG. 17 is a block diagram and process flow for learning and predicting by the system. With respect to learning/training, neural networks, a biologically-inspired programming technique which enables a computer to learn from observational data, are employed in natural language processing, vision and pattern recognition. The Adfone software application can process sequences of ad reaction data. The patterns can be captured and encrypted in the values of connection pairs between AI nodes. This developed knowledge base will evolve over time, capturing knowledge of consumer patterns and ad targeting. With respect to predicting, once a neural net set of values between nodes is established, new data may be fed to the model to predict which follow on set of ads will be of interest for the user. This can be accomplished by coding techniques.

Figure 18:
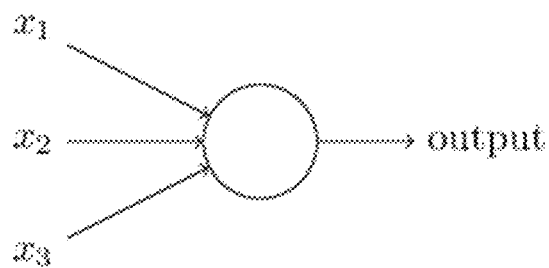
Figure 19:
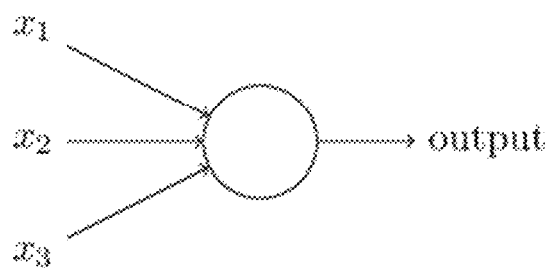

FIG. 18 shows the inputs to an individual "neuron" or perception with respect to AI terminology, while FIG. 19 is a model of neural net connections. The value placed on the links encapsulates the knowledge base of the system's AI.

Figure 20:
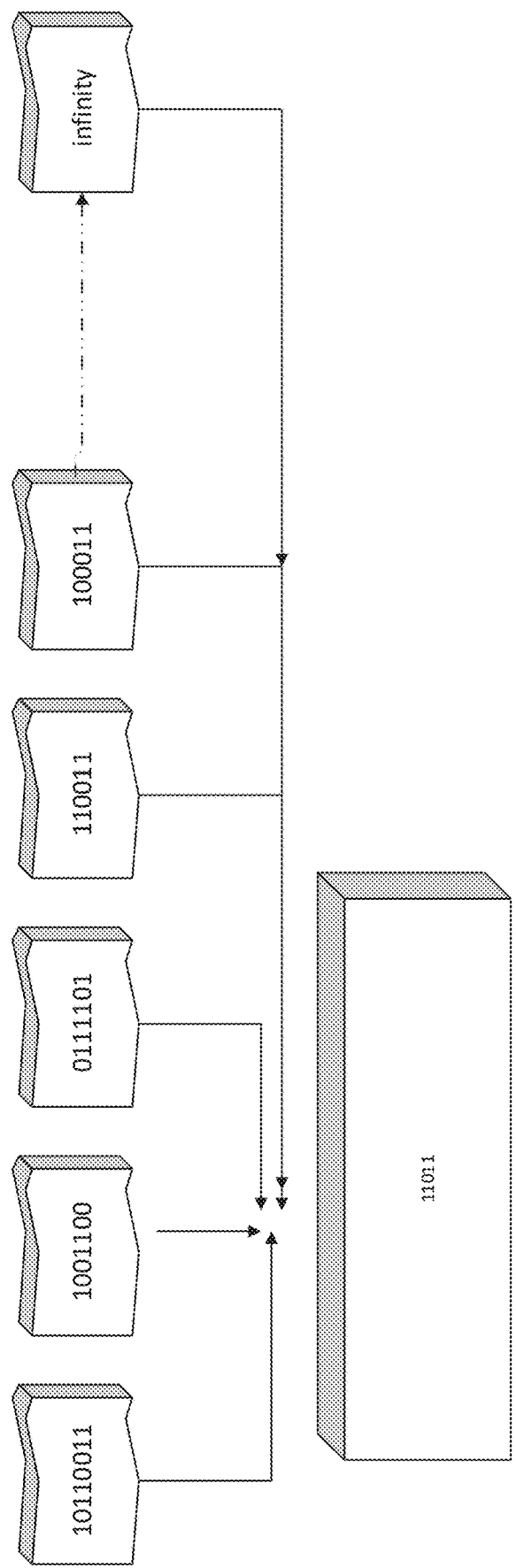

FIG. 20 illustrates a unique identification of binary data for an ad with respect to sampling image content. The disclosed system and method can deploy a novel identification marker of binary streamed data (e.g. ads, videos, $3^{rd}$ party content, etc.). In one non-limiting identification embodiment the system/method can sample the first bit of every word making up the binary file, assembling a highly compressed key for the raw data stream. This key can be used to uniquely identify an ad presented by the Adfone system (Block 7.3) or $3^{rd}$ parties (Block 7.1) for display on a user's mobile device. The system/method can sample the first X words in the file, potentially skipping by an interval based on the predicted size of the streamed data. This key can be utilized to sample, index, store and retrieve a single copy of the binary image data.

Figure 21:
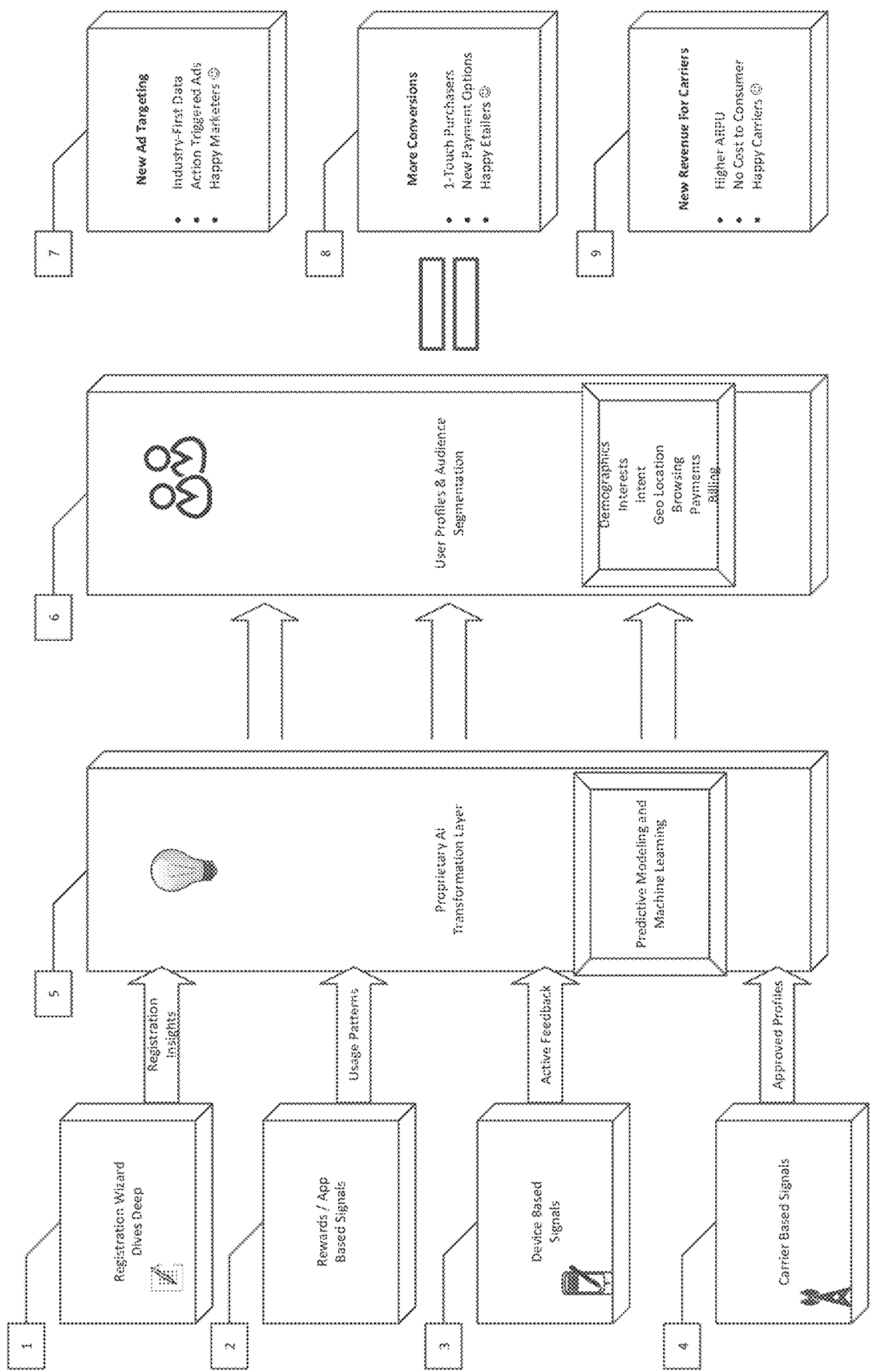

FIG. 21 is a block diagram schematic for the operation of the disclosed system and method. Depicted are the signals that are generated by the end user using the novel software platform (Adfone platform) and how those signals can be processed by the system's AI transformation engine to create predictive models which in turn generate user profiles and audience segmentation for advertising targeting.

Block 1 of FIG. 21 represents a registration wizard, which can be part of a preferably one time/initial setup process whereby the user can be asked a series of questions to establish the basic targeting parameters for the service. Questions such as demographics and category interests can be determined during this process.

Block 2 of FIG. 21 represents rewards/app based signals, which can be a continuous process in perpetuity as long as the user has the Adfone software service running on their mobile device. Assuming the average person unlocks/checks their mobile device between 100-150 times per day (though not considered limiting), then each one of these events creates an opportunity to pick up signals related to the end user's interests. Things such as whether the end user likes or dislikes ads or direct binary questions related to interests and purchase intent are non-limiting examples here.

Block 3 of FIG. 21 represents device based signals. As the user opts-in to use the service provided by the software app (Adfone service), and in doing so agreeing to any stated terms and conditions, the software app is able to mine the user's device for data that can be used to improve the overall profiling dataset. This includes, but is not limited to, app usage data, location based data, browsing history, e-mail content, and text messages. Given the OS level capability of the platform, the Adfone software app is able to access more data than a regular mobile app.

Block 4 of FIG. 21 represents carrier based signals. Wireless carriers collect a trove of first party data on their subscribers from their networks, cell towers, CRM, billing and other enterprise data applications. This data can be used to improve the algorithms related to the targeting of ads. By working with carriers and distribution partners for the service, allows the Adfone service, with the Carrier's permission, to tap into this data source to pick up additional signals related to the end user that can be used for user profiling.

Block 5 of FIG. 21 represents the AI Transformation Layer for the disclosed system. All signals discussed for blocks 1-4 of FIG. 21 can be fed into the Adfone service's AI transformation layer, whereby machine learning and pattern analysis can be used for predictive modelling. This represents the data science layer behind the Adfone service that enables user profiles and audience segments to be created in batch process or real time.

Block 6 of FIG. 21 represents user profiles and audience segmentation. Here processed data from the AI can be used to determine demographics, interests, purchase intent, geo location, and browsing/payment/billing habits for the users of the service.

Block 7 of FIG. 21 represents new ad targeting. The output from blocks 1-6 of FIG. 21 lead to improved ad targeting based on unique data sets that could not be otherwise obtained. The combination of all of these data sets and sections creates one of the novel aspects of the disclosed system and method.

Block 8 of FIG. 21 represents more conversions (i.e. users who purchased a product after seeing the displayed ad or otherwise acted positively after viewing the ad) in view of the targeted ads. Using the targeted ads leads to higher conversion rates for advertisers and online retailers based on the additional intelligence on the end user.

Block 9 of FIG. 21 represents new revenue for carriers. Wireless carriers can also benefit by the Adfone service running on the mobile device. The Adfone service creates a new, growing incremental subscriber revenue stream which can be shared with the wireless carrier by operators of the Adfone service. Preferably, there is no cost to the wireless carrier or the end user for the service, which can be fully ad subsidized.

Figure 22:
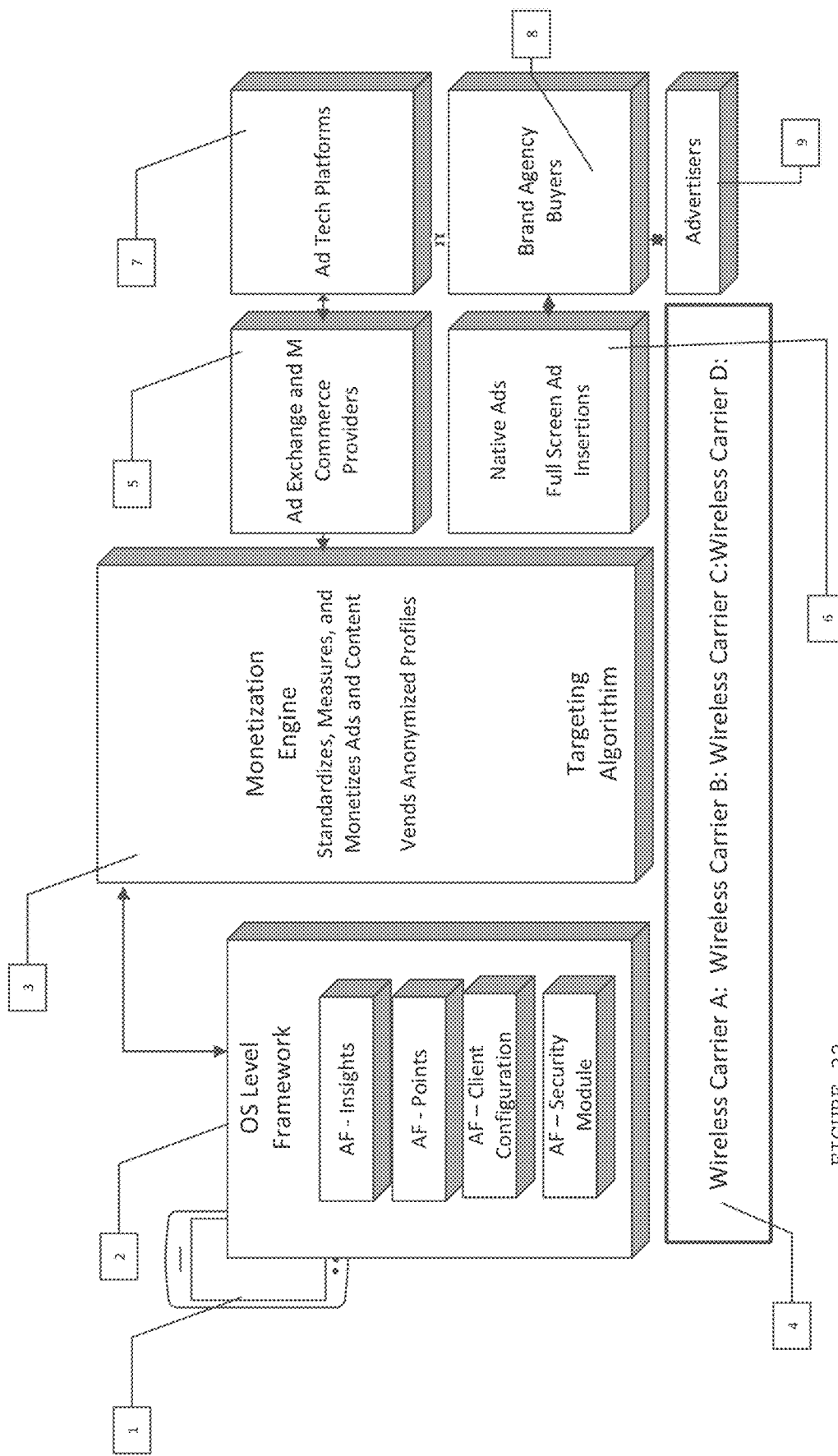

FIG. 22 is a block diagram of the main components of the platform and the possible third party business partners that the platform can integrate with to generate and share revenue. The light purple shaded area depicts Adfone's technical framework which is fully configurable for wireless carriers, whereas the components outside are revenue sources and their associated integration points.

Block 1 of FIG. 22 represents the on device (i.e. mobile device) experience, which can be the end user experience for the preferably opt-in Adfone software service that enables the profiling of end users' interests, the targeting and serving of ads/offers/deals to the end users on their mobile devices based on their interests and the earning and redemption of points by the end user based on their interactions with the ads/offers/deals.

Block 2 of FIG. 22 represents a configurable OS Level Framework. Preferably, each wireless Carrier can have their own unique configuration of the Adfone platform which integrates with their existing rewards and billing platforms. The areas identified such as Insights, Points, Client Config and Security Module can be all configurable components. These can be deployed either at the app level or OS level.

Block 3 of FIG. 22 represents the Adfone system's monetization engine. This platform component deals with the profiling and targeting of end users based on the signals picked up from their usage of the platform.

Block 4 of FIG. 22 represents wireless carrier multi-tenancy. The Adfone platform can be designed to support multiple, uniquely configured, concurrent wireless carrier deployments both domestically and internationally. The multi-tenant architecture of the system allows for a single code base to exist with multiple deployments being deliverable from that code base.

Block 5 of FIG. 22 represents ad exchanges & mCommerce/eCommerce providers. The disclosed system/platform can plug easily into third party revenue sources comprised of ad exchanges and mCommerce/eCommerce providers. Ads/Offers/Deals can be fed into the Adfone platform to be served to end users once processed by the Adfone system's monetization engine.

Block 6 of FIG. 22 represents native ads. In addition to or as an alternative to ads supplied by third party ad networks and exchanges, the Adfone service/system can also have a direct/self-publication capability whereby advertisers can upload their own ads to the system thereby circumventing the need to use such networks or exchanges. Native ads block also is in communication with the monetization engine.

Block 7 of FIG. 22 represents ad tech platforms. Certain Ad Tech Platform are often used by Ad Networks & mCommerce Providers. The disclosed system (Adfone system) can either directly or indirectly integrate with such platforms.

Block 8 of FIG. 22 represents brand agency buyers. Brand Agency Buyers are typically managing the ad placements on behalf of the advertisers.

Block 9 of FIG. 22 represents advertisers. Advertisers representing the demand for the placements of the ads and are the source of the revenue for the Adfone platform.

Figure 23:
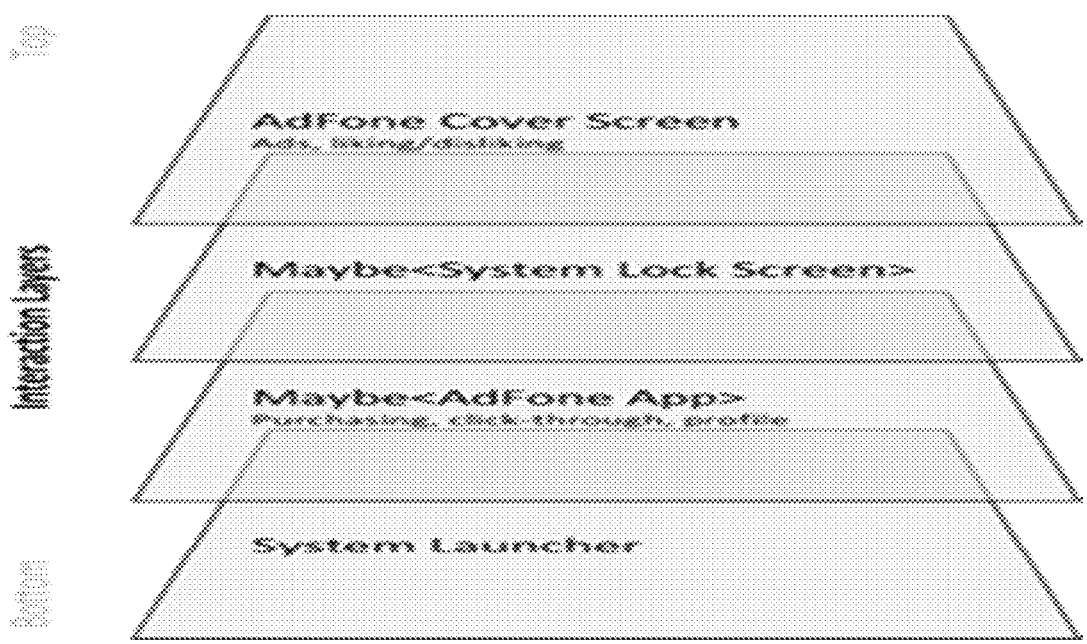

FIG. 23 illustrates the interaction layers for the disclosed system and method.

FIG. 24 illustrates the point redemptions for service credits features of the disclosed system and method. Section 1 represents the points/rewards (Using AdPoints for Service and/or Devices). The points can appear upon power up/screen button. The user may be offered the ability to redeem points for devices and/or credits for mobile services or for other purchases/deals/offers. The points can work by accumulating requisite points for interaction with ads, promotions, content sufficient to redeem points earned for a specific item. Section 2 represents a progress goal indicator. Here the user can be provided with a visual indicator that they have achieved ability to redeem points for a specific item. The system can validate points, which may be variable for each item, and can be redeemable at present points balance. Section 3 illustrates the points push and conversion. Here the system fetches details on usage and/or pushes cash equivalent value to mobile operator's account for the consumer/user. A preferred non-limiting method for accomplishing this can be a direct integration with the mobile operator for billing details, or user profile harvesting/user permission based account fetch. Section 4 represent the points running balance indicator. Here the system can report available point balances and pre/post scenarios when applying points (services balance).

Figure 25:
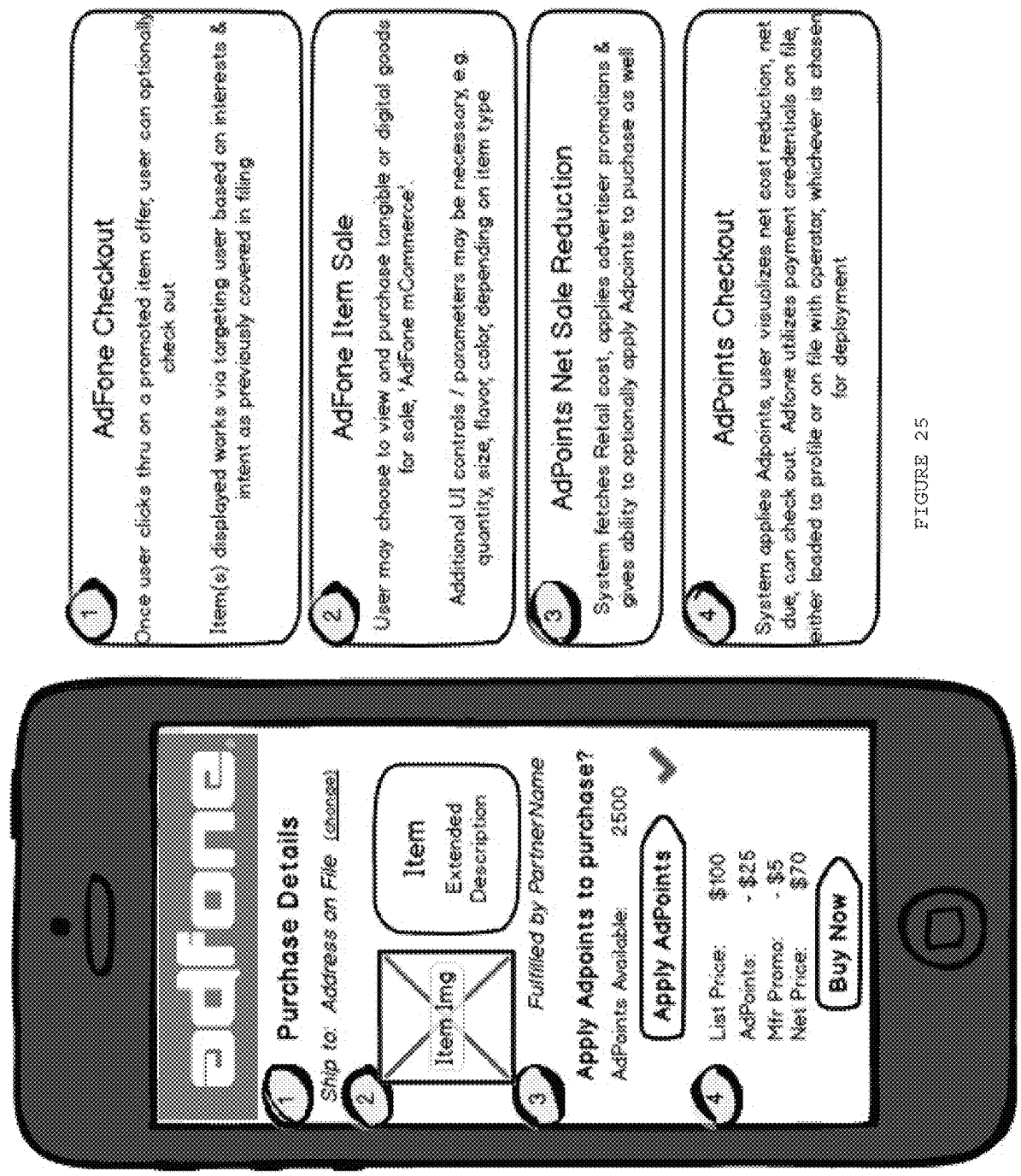

FIG. 25 illustrates the checkout process/screen of the disclosed system and method. Section 1 represents the checkout process. Once the user clicks through on an ad, promoted offer, the user can optionally check out. Item(s) displayed preferably works via targeting the user with ads based on their interests and intent as mentioned above. Section 2 represents the item for sale. The user may choose to view and purchase tangible or digital goods for sale (mCommerce/eCommerce). Additional user interface (UI) controls/parameters may be necessary (e.g. quantity, size, flavor, color, depending on item type). Section 3 represents the net sale reduction using earned points (AdPoints). The system can fetch retail cost, applies any advertiser promotions/discounts and has the ability to optionally apply earned points to purchase the item as well. Section 4 represents the points checkout. Here the system applied earned points and the user can visualize any net cost reduction, the net due and can also check out. The software services (Adfone app) can utilize payment credentials on file, either loaded to profile or on file with the operator, whichever is chosen for deployment.

Figure 26:
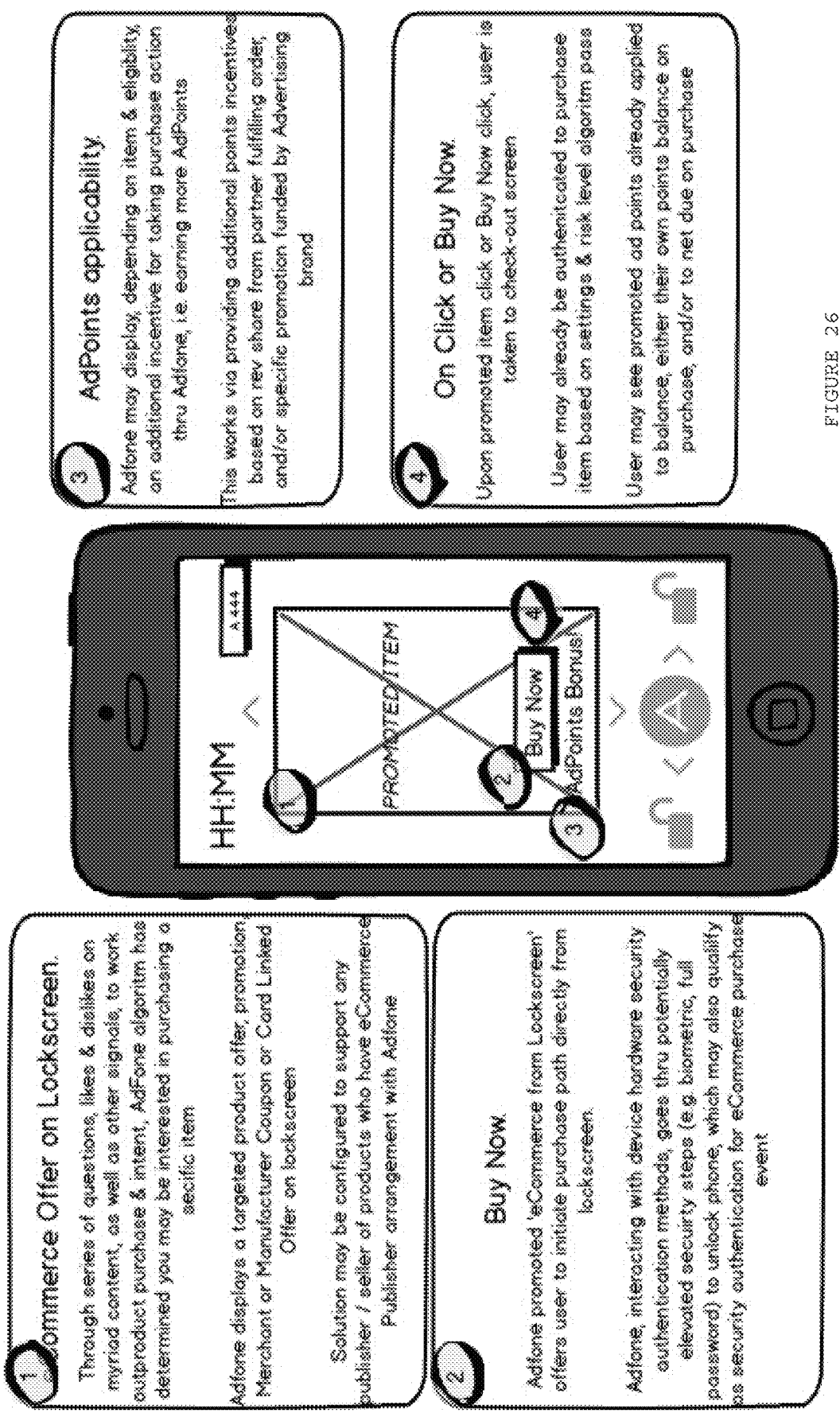

FIG. 26 illustrates performing eCommerce from the lockscreen of the user's mobile device. Section 1 shows an eCommerce offer on the lockscreen. Through a series of questions, likes & dislikes on myriad content, as well as other signals from or about the user, to work outproduct purchase and intent, the system AI determines that the user may be interested in purchasing a specific item. A targeted product offer for the specific item is displayed on the user's mobile device by the disclosed Adfone service. Though not limiting, the ad can be a merchant or manufacturer coupon or card linked offer on the lockscreen. The solution may be configured to support any publisher/seller of products who have eCommerce Publisher arrangements with the Adfone service. Section 2 represents a Buy Now button. With the disclosed software service promoting eCommerce from the lockscreen, the presses or selects the Buy Now button for a displayed offer to initiate a purchase path directly from the lockscreen. The disclosed software services, interacting with the mobile device hardware security authentication methods, preferably goes through potentially elevated secured steps (e.g. biometric, full password, etc.) to unlock the phone (mobile device), which can also serve or qualify as security authentication for eCommerce purchase event. Section 3 represents any earned points (AdPoints) applicability. The Adfone service may display, preferably depending on item and eligibility, an additional incentive for taking purchase action through the Adfone software services (i.e. earning more Adpoints). In one embodiment, additional point incentives can be provided based on revenue sharing from the $3^{rd}$ party business partner fulfilling the order and/or specific promotion funded by advertising brand. Section 4 represents On Click or Buy Now. Here upon the user click upon the promoted item or a "buy now" button, the user can be taken to a check-out screen for purchasing the item. The user may already be authenticated to purchase the item based on settings and risk level algorithms passed. The user may also see promoted ad points already applied to the balance, either their own points balance on purchase and/or the net due on purchase.

FIG. 27 illustrates various components seen by the user on the lock screen at power up or mobile device wake up. Section 1 represents the lockscreen in general which preferably appears upon power up or screen button press. The lockscreen can be achieved through a biometric unlock attempt, and/or automatically, as intermittent display depending on the operation system. By providing a lockscreen, the ad, promotion or other interactive content displayed on the lockscreen forces the user to interact with the displayed content in order to unlock the screen. Interactions expresses the relevance of the content for the user and the user is incentivized through earning points. User impression and actions can be built pre or post unlock event. The Adfone software is internally restricting the permitted actions to Like/Dislike/Click Through or Paginate. Section 2 represents the points earned (Adpoints). A running total of points earned for interactions can be shown. The point total can be incremented up each time the user provides feedback/ or otherwise interacts with the ad. Variable points earned can depend on contact any type of interaction. The system/ method factors relative value of particular actions based on content type, and customer lifetime value. Section 3 represents the content body. This can be the main ad content area, which the ad is preferably targeted for the user based on the user's self-profile, previously entered likes, dislikes, clickthroughs, etc. The user can click on the content to initiate a drill-thru, or can swipe left for a dislike or swipe right for a like. Section 4 represents a Click Out. Here the user click or otherwise selects an option to open a website related to the ad content. If this action is taken, with the clicking/selection of the "Open Website" text (or similar language), the user can earn points and the website opens. If the user clicks in area away from the Open Website link, the user can be returned to an ad view. Section 5 represents pagination, which permits the user to flip through additional ad/content units. Internally, the software app pre-fetches a small array of ads/offers based on the user's profile determined by the targeting algorithm. The user can swipe or use arrows to paginate up or down. Sections 6 and 7 represent the AdFone points slider. Here the user can choose to like/dislike an ad and earn variable points for such interactions. A heart can be displayed for a "like" and an "X" can be displayed for a dislike (which can be on the slide). Points are associated with the action. Ads and other specific content can also be saved to a user's offers queue where the use may view and take action later for the ad or other content.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure. It is also recognized that may of the processes and digital steps performed by the disclosed system and method may be achieved through cloud based technology.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed as a critical, required, or essential features or elements of any or all the claims.

While the disclosure has been described in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A method for forcing a user to view and react to an advertisement displayed on a screen of a mobile device of a user with the user's reaction specifically related to the advertisement displayed and customizing future advertisements send to the mobile device based on the user's reaction to the advertisement and previously displayed advertisements, comprising the steps of:

running an application software on a mobile device which is in communication with one or more ad servers for displaying an interactive full screen electronic advertisement on a locked display screen of the mobile device upon powering up or waking up the mobile device and which prevents normal operation of the mobile device when powering up or waking up of the mobile device;

receiving the interactive electronic advertisement by the mobile device;

automatically presenting and displaying, by the application software, the full screen electronic advertisement on the locked display screen of the mobile device as the initial presentation on the locked display screen upon powering up or waking up of the mobile device and prior to any user identification being entered or received by the mobile device or other functions being launched or executed at an operating system level for the mobile device;

maintaining the screen of the mobile device locked until the user performs one of a plurality of preconfigured electronic functions on the mobile device directly concerning and related to the displayed ad, wherein the plurality of preconfigured electronic functions comprise a first electronic action by the user to the screen to indicate a favorable response with respect to the displayed ad and a second electronic action by user to the screen to indicate an unfavorable response with respect to the displayed ad;

associating the plurality of preconfigured electronic functions directly concerning and related to the displayed ad to also unlock the screen when performed by the user;

unlocking the screen of the mobile device by the application software only after the user performs one of the plurality of preconfigured electronic functions on the mobile device such that the application software is the dominant software application on the mobile device until the user directly interacts with the displayed electronic advertisement;

creating targeted advertisements to be presented and displayed on the locked display screen of the mobile device based on the user's electronic interactions with the interactive electronic advertisement and previously presented and displayed interactive electronic advertisements; and using accumulated points from interacting with one or more electronic advertisements displayed on the locked display screen of the mobile device to pay off or lower an amount of a phone bill for the mobile device.

2. The method for forcing a user to view and react to an advertisement of claim 1 wherein the first electronic action comprises swiping the screen to the right by the user to indicate the favorable response with respect to the displayed ad and the second electronic action comprises swiping the screen to the left by the user to indicate the unfavorable response with respect to the displayed ad.

3. The method for forcing a user to view and react to an advertisement of claim 1 wherein the step of unlocking the screen of the mobile device comprises: determining by a software application that the user performed one of the preconfigured electronic functions from the plurality of preconfigured electronic functions; and unlocking the screen of the mobile device from instructions received from the software application after the software application determines that the user performed one of the preconfigured electronic functions such that the user is provided with full access and use of the mobile device.

4. The method for forcing a user to view and react to an advertisement of claim 3 further comprising the step of: incentivizing an electronic account for the user by the software application each time the software application determines that the user performed one of the preconfigured electronic functions.

5. The method for forcing a user to view and react to an advertisement of claim 4 wherein the electronic incentive are points added to the electronic account for the user, wherein the adjustments to an original amount of the phone bill are calculated by the software application.

6. The method for forcing a user to view and react to an advertisement of claim 2 further comprising the steps of saving the user's favorable and unfavorable responses and creating a profile for the user by the software application running on the mobile device at least based on the saved user's favorable and unfavorable responses.

7. The method for forcing a user to view and react to an advertisement of claim 6 further comprising the step of selecting future advertisements to the send to the lock screen of the mobile device based on the created user's profile.

8. The method for forcing a user to view and react to an advertisement of claim 6 further comprising the step of updating or further customizing the user profile each time the user enters another favorable or unfavorable response to an advertisement displayed on the mobile device.

9. The method for forcing a user to view and react to an advertisement of claim 6 further comprising the steps of displaying one or more profile questions on the screen of the mobile device, receiving answers for the one or more profile questions and further customizing the user's profile based on the answers received for the one or more profile questions.

10. The method for forcing a user to view and react to an advertisement of claim 2 wherein the plurality of preconfigured electronic functions further comprise selecting a button appearing on the screen representing a "buy" action when a user wishes to purchase a product or service appearing in the displayed advertisement.

11. The method for forcing a user to view and react to an advertisement of claim 10 further comprising the step of displaying a separate purchase page for the product or service on the screen of the mobile device upon the user selecting the "buy" button.

12. The method for forcing a user to view and react to an advertisement of claim 10 further comprising the step of unlocking the screen of the mobile device from instructions received from the software application after the software application determines that the user selected the "buy" button such that the user is provided with full access and use of the mobile device.

13. A method for forcing a user to view and react to an advertisement displayed on a screen of a mobile device of a user for obtaining user feedback concerning a content of the advertisement and with the user's reaction specifically related to the advertisement displayed and customizing future advertisements send to the mobile device based on the user's reaction to the advertisement and previously displayed advertisements, the method comprising the steps of:

running an application software on a mobile device which is in communication with one or more ad servers for displaying an interactive full screen electronic advertisement on a locked display screen of the mobile device upon powering up or waking up the mobile device and which prevents normal operation of the mobile device when powering up or waking up of the mobile device;

receiving from a user of the mobile device preferences for the advertisements to be presented and displayed on a locked displayed screen of the mobile device;

receiving the interactive electronic advertisement by the mobile device;

automatically presenting and displaying, by the application software, the full screen electronic advertisement on a locked display screen of the mobile device as the initial presentation on the locked display screen upon powering up or waking up of the mobile device and prior to any user identification being entered or received by the mobile device or other functions being launched or executed at an operating system level for the mobile device;

maintaining the screen of the mobile device locked until the user actively performs one of a plurality of preconfigured electronic functions on the mobile device directly concerning and related to the displayed ad in order to obtain user feedback regarding the content of the advertisement, wherein the plurality of preconfigured electronic functions comprise swiping the screen in a first direction to indicate a favorable response with respect to the displayed ad or swiping the screen in a second direction to indicate an unfavorable response with respect to the displayed ad;

associating the plurality of preconfigured electronic functions directly concerning and related to the displayed ad to also unlock the screen when performed by the user;

unlocking the screen of the mobile device by the application software only after the user actively performs one of the plurality of preconfigured electronic functions on the mobile device such that the application software is the dominant software application on the mobile device until the user directly interacts with the displayed electronic advertisement on the locked displayed screen;

creating targeted advertisements to be presented and displayed on the locked display screen of the mobile device based on the user's electronic interactions with the interactive electronic advertisement and previously presented and displayed interactive electronic advertisements; and using accumulated points from interacting with one or more electronic advertisements displayed on the locked display screen of the mobile device to pay off or lower an amount of a phone bill for the mobile device.

14. The method for forcing a user to view and react to an advertisement of claim 1 further comprising the step of receiving from the user preferences for the advertisements to be presented and displayed on the locked displayed screen of the mobile device and using the user preferences along with the user's previous electronic interactions when customizing future advertisements for use as targeted advertisements.

15. The method for forcing a user to view and react to an advertisement of claim 14 wherein part of the preferences received from the user includes information from the user indicating a number of advertisements the user wishes to be presented with for a given time period.

16. The method for forcing a user to view and react to an advertisement of claim 13 wherein part of the preferences received from the user includes information from the user indicating a number of advertisements the user wishes to be presented with for a given time period.

17. The method for forcing a user to view and react to an advertisement of claim 13 wherein swiping in a first direction comprises swiping the screen to the right to indicate the favorable response and wherein swiping in a second direction comprises swiping the screen to the left to indicate the unfavorable response.

18. A method for forcing a user to view and interact with a displayed content on a locked screen of a mobile device of a user, comprising the steps of:

running an application software on a mobile device which is in communication with one or more servers for displaying an interactive full screen electronic content on a locked display screen of the mobile device upon powering up or waking up the mobile device and which prevents normal operation of the mobile device when powering up or waking up of the mobile device;

receiving the interactive electronic content by the mobile device;

automatically presenting and displaying, by the application software, the full screen electronic content on the locked display screen of the mobile device as the initial presentation on the locked display screen upon powering up or waking up of the mobile device and prior to any user identification being entered or received by the mobile device or other functions being launched or executed at an operating system level for the mobile device;

maintaining the screen of the mobile device locked until the user performs one of a plurality of preconfigured electronic functions on the mobile device directly concerning and related to the electronic content;

associating the plurality of preconfigured electronic functions directly concerning and related to the displayed electronic content to also unlock the screen when performed by the user;

unlocking the screen of the mobile device by the application software only after the user performs one of the plurality of preconfigured electronic functions on the mobile device such that the application software is the dominant software application on the mobile device until the user directly interacts with the displayed electronic content; and using accumulated points from interacting with one or more electronic content displayed on the locked display screen of the mobile device to pay off or lower an amount of a phone bill for the mobile device.

* * * * *